(12) United States Patent
Roebke et al.

(10) Patent No.: US 8,028,890 B2
(45) Date of Patent: Oct. 4, 2011

(54) DISTRIBUTION SERVICES RESERVATION INTEGRATION

(75) Inventors: Mark J. Roebke, Avon, CO (US); Andrew M. Soulakis, Avon, CO (US)

(73) Assignee: RTP, LLC, Avon, CO (US)

( * ) Notice: Subject to any disclaimer, the term of this patent is extended or adjusted under 35 U.S.C. 154(b) by 932 days.

(21) Appl. No.: 11/927,166

(22) Filed: Oct. 29, 2007

(65) Prior Publication Data
US 2008/0142581 A1    Jun. 19, 2008

Related U.S. Application Data

(60) Provisional application No. 60/863,208, filed on Oct. 27, 2006.

(51) Int. Cl.
*G06F 17/00* (2006.01)
(52) U.S. Cl. .................................. 235/375; 235/381
(58) Field of Classification Search .................. 235/375, 235/381, 380, 383, 492, 493; 705/9, 2, 11, 705/5, 26
See application file for complete search history.

(56) References Cited

U.S. PATENT DOCUMENTS

| | | | |
|---|---|---|---|
| 7,136,822 B2 * | 11/2006 | Kimura et al. ................. 705/5 |
| 2002/0049535 A1 * | 4/2002 | Rigo et al. .................... 701/211 |
| 2003/0097283 A1 * | 5/2003 | Kimura et al. .................... 705/5 |
| 2003/0097307 A1 | 5/2003 | Greene |
| 2003/0220813 A1 | 11/2003 | Gurvey |
| 2005/0278216 A1 | 12/2005 | Graves |
| 2006/0189393 A1 | 8/2006 | Edery |
| 2007/0083400 A1 * | 4/2007 | Katz ................................. 705/5 |
| 2008/0133281 A1 * | 6/2008 | Bolt et al. ......................... 705/5 |
| 2008/0142581 A1 * | 6/2008 | Roebke et al. ................ 235/375 |
| 2010/0076810 A1 * | 3/2010 | Loeffen ............................ 705/9 |

OTHER PUBLICATIONS

International Search Report and Written Opinion for International Application No. PCT/US07/76453, mailed May 9, 2008.

* cited by examiner

*Primary Examiner* — Thien M. Le
(74) *Attorney, Agent, or Firm* — Faegre & Benson LLP

(57) ABSTRACT

Systems according to embodiments of the present invention include a core adapter module configured to receive reservation information from a reservation system in a first format useable be the reservation system, a web service module configured to identify a provider system based on the reservation information and to place the reservation information into a second format useable by the provider system, and a distribution module configured to send the reservation information in the second format to the provider system. Methods according to embodiments of the present invention include receiving reservation from a reservation system in a first format useable by the reservation system identifying a provider system based on the reservation information, processing the reservation information to place the reservation information into a second format useable by the provider system, and sending the reservation information in the second format to the provider system.

20 Claims, 8 Drawing Sheets

DISTRIBUTION SERVICES RESERVATION INTEGRATION

CROSS-REFERENCE TO RELATED APPLICATIONS

This application claims the benefit of U.S. Provisional Patent Application Ser. No. 60/863,208, filed on Oct. 27, 2006, and entitled, "Distribution Services Reservation Integration," which is incorporated herein by reference in its entirety for all purposes.

TECHNICAL FIELD

Embodiments of the present invention relate generally to distribution services reservation and media activation integration, and more specifically to systems and methods for facilitating electronic reservations and media activations.

BACKGROUND

Today, people commonly book trip reservations online. For example, a person may access an online travel reservation service, such as Expedia.com™, to reserve basic items such as a hotel room, airline tickets, and a rental car, which are necessary for people to get to and from the destination, and stay at the destination during the trip. For these common elements of travel, most online travel reservation systems have electronic interfaces to service providers to book and reconcile the reservation. In addition to basic travel components, people typically want to reserve additional products, services or activities, which are not directly related to the travel or room accommodations. For example, a person may want to purchase lift tickets to a ski resort, reserve a sightseeing tour, or tickets to a live show. Historically, the processes and systems used to reserve additional components of a trip are not served by electronic interfaces, and thus subject to risks related to data integrity, fraud, and reservation error.

Current systems are characterized by error-prone manual steps in the process of taking and making a person's reservation. For example, when the person (i.e., the guest) places a reservation for a resort through an online reservation service, an email itinerary/reservation is sent from the online reservation service to a receiving party (e.g., accounting department) at the resort. The email itinerary/reservation typically remains in an email inbox at the resort without any real attention until later when the reservation and sale are reconciled. Later, at the time of the reservation, the guest arrives at the resort and presents a paper voucher that was provided to the guest by the online reservation service. The paper voucher indicates a product that was reserved or purchased by the guest, as well as the online reservation service that was used to make the reservation. An employee (e.g., desk attendant) at the resort attempts to make a point-of-sale (POS) transaction based on the voucher.

The POS transaction involves carrying out the terms of the reservation, for example by identifying the product (e.g., sightseeing tour, ski lift ticket) represented by the paper voucher, and providing the product using the resort's sales/reservation system. In conventional systems, the employee who accepts the voucher from the guest must interpret the paper voucher in order to properly carry out the product reservation/purchase. This can be a challenging, time-consuming, error-prone task, in part because every online reservation service typically generates a voucher with a unique data format or look. In addition, the employee may often be unable to authenticate the voucher at the time of the POS transaction. As such, the employee essentially trusts the voucher's legitimacy and his interpretation of the voucher when making the POS transaction.

In addition to the POS transaction, the sale must be reconciled with the reservation that was sent earlier by the online reservation service to the resort. Accordingly, the paper voucher from the guest is typically submitted to the receiving party at the resort who originally received the itinerary/reservation from the online reservation service for reconciliation. The receiving party manually reconciles the paper voucher against the itinerary/reservation that was originally sent, and then attempts to collect payment from the online reservation service using the paper voucher. As such, conventionally, the POS transaction has been disconnected from the reservation reconciliation process. The disconnection between the POS transaction and the reconciliation introduce potential for error. In addition, the manual reconciliation process is time-consuming and error-prone.

SUMMARY

Systems for reservation integration and distribution according to embodiments of the present invention include a core adapter module configured to receive reservation information from a reservation system in a first format useable by the reservation system, a web service module configured to identify a provider system based on the reservation information and to place the reservation information into a second format useable by the provider system, and a distribution module configured to send the reservation information in the second format to the provider system. The reservation information may include at least a name, a basic service, and a credit card number, for example. In some cases, the basic service information includes an arrival date for a ski resort lodging reservation. According to some embodiments of the present invention, the distribution module is further configured to create an advance sale on the provider system according to the reservation information.

Methods of reservation integration and distribution according to embodiments of the present invention include receiving reservation information from a reservation system in a first format useable by the reservation system, identifying a provider system based on the reservation information, processing the reservation information to place the reservation information into a second format useable by the provider system, and sending the reservation information in the second format to the provider system. In some cases, the reservation information includes at least a name, a basic service, a service provider providing the basic service, and a credit card number. The basic service may be an arrival date for a ski resort lodging reservation, and the service provider may be a ski resort, for example. In addition, an advance sale may be created on the provider system according to the reservation information.

Methods for media activation according to embodiments of the present invention include receiving a media activation request from a distribution point-of-sale system in a first format useable by the distribution point-of-sale system, identifying a provider system based on the media activation request, processing the media activation request to place the media activation request into a second format useable by the provider system, and sending the media activation request in the second format to the provider system. According to some embodiments, the media activation request includes at least a unique identification number and a service provider. According to other embodiments, the media activation request is a request to activate a physical medium for use in accessing services provided by a service provider, and embodiments of the methods further include updating a database of the provider system with an activation of the physical medium based on the media activation request, and providing a supplier interface, in communication with the database, configured to read the physical medium and to permit access to the services based on the activation. In some cases, the physical medium is a card with a magnetic strip, and the supplier interface is a magnetic card stripe reader; in other cases, the physical medium is an object with an RFID transmitter, and the supplier interface is an RFID receiver; and in yet other cases, the physical medium is an object including a bar code, and the supplier interface is a bar code reader. According to some embodiments, the object is a toy race car, the service provider is a car racing venue, and the supplier interface is configured to permit access to the car racing venue by unlocking a gate based on the media activation.

Systems for media activation according to embodiments of the present invention include a core adapter module configured to receive a media activation request from a distribution point-of-sale system in a first format useable by the distribution point-of-sale system, a web service module configured to identify a provider system based on the media activation request and to place the media activation request into a second format useable by the provider system, and a distribution module configured to send the media activation request in the second format to the provider system. According to some embodiments, the media activation request includes at least a unique identification number and a service provider. According to other embodiments, the media activation request is a request to activate a physical medium for use in accessing services provided by a service provider, the systems according to such embodiments further including a database of the provider system configured to store an activation of the physical medium based on the media activation request, and a supplier interface in communication with the database and configured to read the physical medium and to permit access to the services based on the activation. In some cases, the physical medium is a card with a magnetic strip, and the supplier interface is a magnetic card stripe reader; in other cases, the physical medium is an object with an RFID transmitter, and the supplier interface is an RFID receiver; and in yet other cases, the physical medium is an object including a bar code, and the supplier interface is a bar code reader. According to some embodiments, the object is a toy race car, the service provider is a car racing venue, and the supplier interface is configured to permit access to the car racing venue by unlocking a gate based on the media activation.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
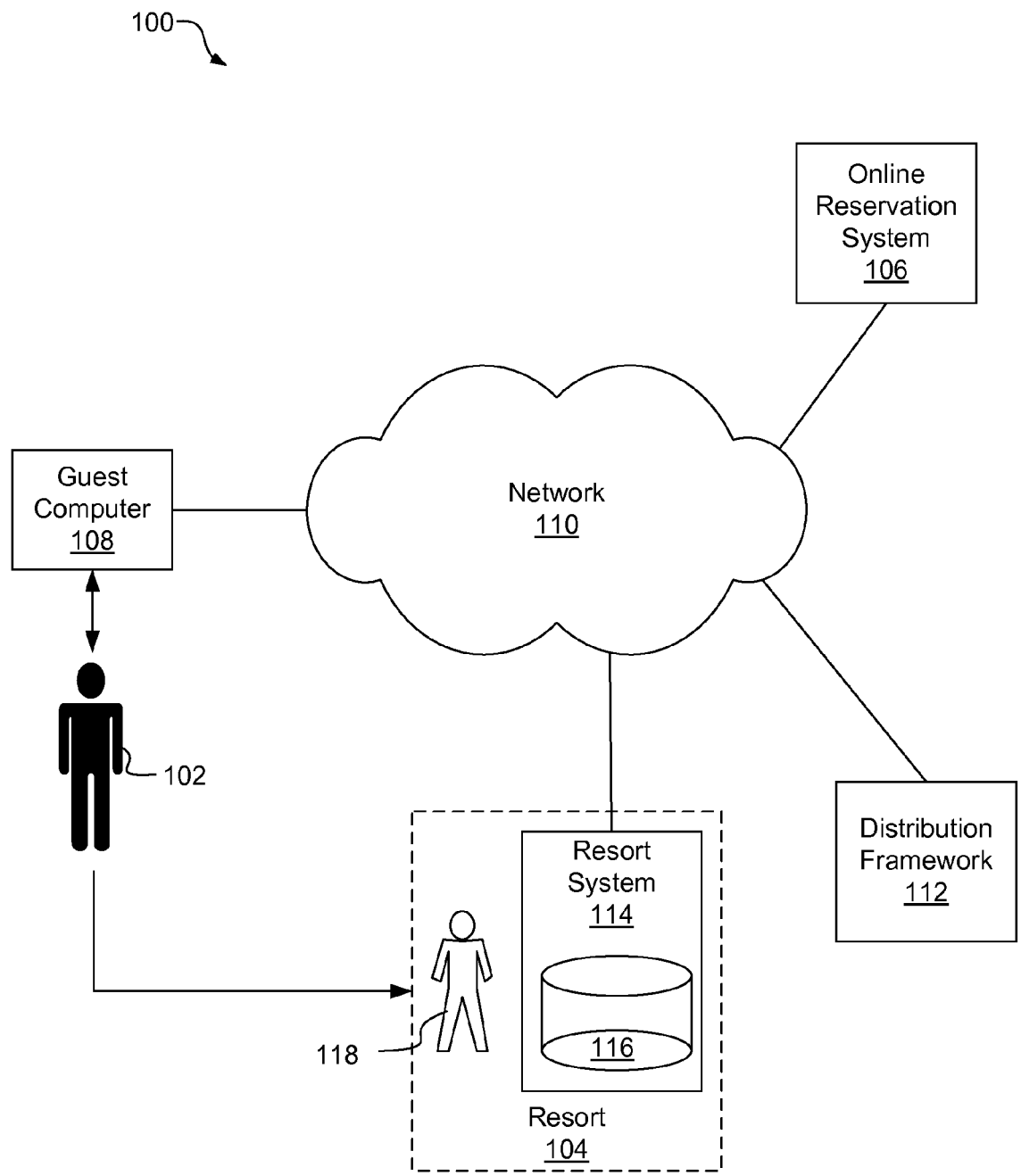
FIG. 1 illustrates an exemplary operating environment in which an online reservation framework may execute in accordance with an embodiment of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Embodiments of the present invention generally relate to systems and methods for facilitating, making and reconciling reservations for products and services in an online environment. More specifically, embodiments relate to a framework for logically integrating the reservation process among multiple systems in the reservation and reconciliation processes. Some embodiments relate to a scalable framework logically located between one or more online reservations systems and one or more product/service provider systems to automatically push reservations to the product/service provider system(s) and automatically reconcile product/service sales with reservations made through online reservation systems. As such, the reservation and reconciliation process appears as a seamless, integrated system.

One embodiment of the reservation framework includes a multi-tier architecture. In this embodiment, various reservation and reconciliation processes are carried out by multiple modules. Some of these modules comprise a core framework that may interact with other modules executing at the online reservation systems and/or the product/service provider systems. The core framework includes interfaces and functionality for interacting with potentially multiple different online reservation systems/interfaces and multiple different product/service provider systems/interfaces. In addition, the core framework can be scaled to interact with other different interfaces. Interfaces at the online reservation system and the product/service provider system may include adapter modules that interact seamlessly with the core framework.

One or more preferred embodiments are described below with reference to the accompanying figures. In addition, the attached Appendix A describes one or more preferred embodiments. Prior to describing one or more preferred embodiments of the present invention, definitions of some terms used throughout the description are presented.

The terms "online reservation system" and "online reservation service" refer broadly to any reservation taking system or service that is accessible via a network. By way of example, but not limitation, online reservation systems and online reservation services include Orbitz™, Travelocity™, and Expedia™. Although embodiments described herein relate primarily to reservation services that are accessible over the Internet, the invention is not limited to Internet-based reservation services. For example, other reservation services may take reservations over the phone, or in person, and enter the reservations/itineraries into a network-based system, from which the reservations can be processed in a manner similar to reservations taken by Internet-based online reservation services.

The terms "customer" and "guest" refer broadly to any consumer of services or products. This application relates primarily to the reservation, advance sale, and/or sale of services and products. Products and services may be consumed during a trip (e.g., a day-trip, a vacation) that a customer takes.

The term "trip" refers broadly to any outing that is taken by a customer, and may include trips of relatively short distance or long distance. For example, a customer could take a trip to a resort that is close (e.g., one to one hundred miles) to the customer's home, or the customer could take a trip to a resort that is relatively far (e.g., one hundred to thousands of miles) from the customer's home.

The term "product/service provider" refers broadly to any entity that provides products and/or services. By way of example, but not limitation, product/service providers include attractions, themed amusements, resorts (e.g., ski resorts), tour providers and the like.

The term "basic product/service" refers to products and/or services that are essential to a trip taken by a customer. For example, for overnight trips, a hotel or motel room is typically considered a basic product/service. Travel accommodations, such as cars, buses, trains, and/or airline accommodations are typically also considered basic products/services.

The term "travel products" refers to products, services, and/or activities that are not necessarily essential to a consumer's trip. By way of example, but not limitation, the travel products include ski lift tickets, spa appointments, tickets to sight-seeing tours, and tickets to shows and performances.

The term "module" refers broadly to software, hardware, or firmware components (or any combination thereof). Modules are typically functional components that can generate useful data or other output using specified input(s). A module may or may not be self-contained. An application program (also called an "application") may include one or more modules, or a module can include one or more application programs or applets.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer or computer-like device (e.g. game console, IP devices), and can include, without limitation, computer storage media and communications media. Computer storage media generally refers to any type of computer-readable memory, such as, but not limited to, volatile, non-volatile, removable, or non-removable memory. Computer storage media may be magnetic, optical, or other format. Communication media refers to a modulated signal carrying computer-readable data, such as, without limitation, program modules, instructions, or data structures.

FIG. 1 illustrates an exemplary operating environment 100 in which an integrated reservation architecture can execute in accordance with one embodiment. A guest 102 books a reservation at a product/service provider, such as a resort 104, using an online reservation system 106. The reservation may include basic products/services as well as other travel products. The guest 102 communicates with the online reservation system 106 using a computer 108 that is in communication with the online reservation system 106 via a network 110. The online reservation system 106 takes the reservation and makes the reservation available to a reservation distribution framework 112. The reservation distribution framework 112 processes the reservation and provides the processed reservation to a resort reservations and sales system 114 of the resort 104. The resort system 114 typically stores the reservation in memory, such as a database 116. According to some embodiments of the present invention, data is sent to the online reservation system 106 in a binary data format, a text-based data format, and/or a non-XML application programming interface format, or which ever format is useable by the online reservation system 106 to accept information from a user. According to embodiments of the present invention, data is then sent from the online reservation system 106 to the reservation distribution framework 112 in an XML format including a header and a payload which is created by and useable by the online reservation system 106. The reservation distribution framework 112 may then, with a message formatter module, perform additional processing of the initial request and prepare a message for delivery to the supplier in an XML format which is useable by the supplier. Finally, the data in the request may be formatted to match the requirements of the supplier's system, such as, for example, in an XML format, a direct database interaction, and/or modern application programming interface format useable by the supplier.

Beneficially, the distribution framework 112 can perform pre-processing on the reservation to facilitate an integrated reservation process that is less error-prone and more trustworthy that conventional processes. For example, the distribution framework 112 can be designed to accept only legitimate reservations from authorized online reservation services 106. In addition, the distribution framework 112 can process reservations from the online reservation system 106 by creating reservations that are in a format that is similar to, or compatible with, reservations used by the resort system 114. In the embodiment of FIG. 1, the distribution framework 112 pushes the guest's processed reservation to the resort system 114, to thereby create an advanced sale in the resort system 114. The pre-processing and advanced sale process has the beneficial effect of automatically performing or obviating steps in the reservation process prior to the guest's 102 arrival at the resort 104 that in conventional systems would have been carried out by resort staff manually.

To illustrate, after making the reservation, the guest 102 arrives at the resort 104 on the scheduled date. The guest 102 does not need to have a reservation voucher, or other document, with him in order to make use of the reserved products/services. Rather, a resort attendant 118 enters identification data of the guest 102 into the resort system 114 to locate the guest's reservation. Because the reservation has been entered as an advanced sale, the reservation is quickly retrieved and is already in a format that is commonly used by, and readily understood by, the resort attendant 118. For example, any travel products may already have been entered into the resort system 114, such that the resort attendant 118 does not need to interpret a paper voucher from the guest 102 to determine what products/services the guest has reserved.

In accordance with some embodiments of the present invention, the advanced sale is reconciled with the reservation automatically, and online reservation system 106 supports such automatic reconciliation. The resort system 114 may, according to such embodiments, automatically submit the advance sale to the online reservation system 106 for payment.

Referring to the guest computer 108 again, the guest computer 108 can be any computing device operable to communicate over the network 110 with the online reservation system 106. By way of example, but without limitation, the guest computer 108 could be a desktop computer, a laptop computer, a handheld computer, or a cell phone. The computer 108 includes functionality to communicate via one or more network protocols, such as Hypertext Transport Protocol (HTTP), Transmission Control Protocol/Internet Protocol (TCP/IP), File Transfer Protocol (FTP), and/or Simple Mail Transport Protocol (SMTP). The computer 108 typically includes a web browser application that can navigate web pages and present the web pages to the guest 102.

In various embodiments, the online reservation system 106 includes a web server that serves web pages in a markup language format (e.g., Hypertext Markup Language). The browser on the guest computer 108 reads web pages from the online reservation system 106. Through the web pages, the guest 102 can enter reservation data such as products needed, services needed, dates of travel, name, credit card information, other payment information, customer loyalty program information (e.g., frequent flyer ID), and the like. As such, the online reservation system 106 gathers the reservation information and builds an itinerary for the guest 102.

The network 110 may be composed of one or more networks and/or sub-networks. For example, the network 110 may be the Internet, which itself is composed of numerous sub-networks. The network 110 may include wired and wireless portions. The network may include switched networks, such as the Public Switched Telephone Network (PSTN) and Voice over Internet Protocol (VoIP) networks. The network 110 may include Local Area Networks (LANs), Wide Area Networks (WANs), backbone networks and others. In addition, one or more of the interactions among the systems in the network environment 100 may be carried out via one or more virtual private networks (VPN).

It will be understood that the embodiment shown in FIG. 1 is greatly simplified from an actual network environment for purposes of illustration. In actual operation, the network environment would include numerous guests, guest computers, online reservation systems, resorts, and potentially numerous distribution frameworks. As such, a distribution framework 112 can support numerous different online reservation systems 106 and numerous different resorts 104. The capabilities of the distribution framework 112 can be leveraged among the numerous online reservation systems as well as the numerous resorts 104.

Figure 2:
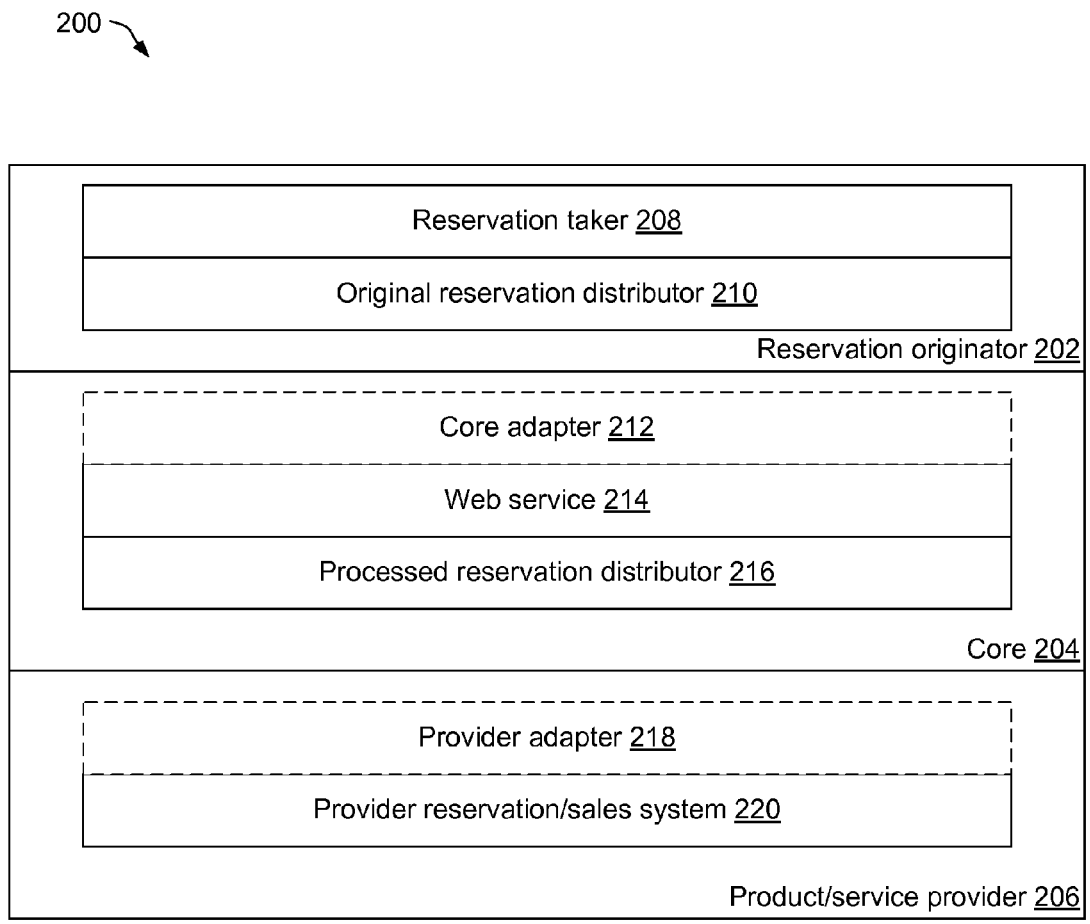
FIG. 2 illustrates a three-tier architecture for integrating an online reservation process in accordance with an embodiment of the present invention.

FIG. 2 illustrates an exemplary three-tier architecture 200 for providing end-to-end integrated reservation services. In this embodiment, the architecture 200 is composed of a reservation originator tier 202, a core tier 204, and a product/service provider tier 206. In one embodiment, the online registration system 106 of FIG. 1 is configured to perform functions of and/or include modules associated with the reservation originator tier 202, the distribution framework 112 of FIG. 1 is configured to perform functions of and/or include modules associated with the core tier 204, and the resort system 114 of FIG. 1 is configured to perform functions of and/or include modules associated with product/service provider tier 206.

The reservation originator tier 202 includes a reservation taker module 208 and an original reservation distributor module 210. The reservation taker 208 interacts with another application or a user to take reservation information and produce an original reservation that may be in the form of a document or other set of data in memory. Typically, the original reservation has its own distinct format, such as the types of data included, the organization or order of the data, and so on. The original reservation distributor 210 makes the original reservation available to the core tier 204. Alternatively, the core tier 204 may retrieve the reservation from a designated location.

An optional core adapter 212 serves as an interface to the reservation originator 202. The core adapter 212 may be implemented to handle an interface protocol that is specific to the reservation originator 202. In other embodiments, the core adapter 212 may not be necessary, for example, where the reservation originator 202 includes a standard interface.

A web service 214 uses reservation data from the reservation originator 202 to create a reservation that is compatible with the appropriate product/service provider 206. As such, web service 214 determines which product/service provider is specified in the reservation, and formats and/or reformats as necessary, a reservation that has a format corresponding to the reservation format used by the product/service provider 206. After the original reservation is processed by the web service 214, a core reservation distributor 216 distributes the processed reservation to the appropriate product/service provider 206.

The product/service provider 206 may interface with the core tier 204 via a provider adapter 218 that handles any special provider interface protocols as necessary. The provider reservation/sales system 220 is configured to receive and store the processed reservation. The provider reservation/sales system 220 is also operable to retrieve the reservation information when it is queried.

Core tier 204 may be component tier coded using C++, and may be a multi-threaded environment, according to embodiments of the present invention. According to some embodiments, core tier 204 performs product activation. Both pre-printed media and print-on-demand media can be activated through the core tier 204. When a media product is sold by a distribution partner, the core tier 204 may send a message to the supplier to activate the product within the supplier's operations system. Once the media is activated, the customer can use the product for direct access to the resort or attraction. According to some embodiments of the present invention, core tier 204 performs order processing. More complex transactions that generate an itinerary may use core tier 204 to process the non-global distribution systems products in an itinerary. Such products may be passed through the core tier 204, which in turn sends a message to the supplier's system to create an order. Once the order is placed, the supplier's normal fulfillment process is used to fulfill the order. The itinerary/order interface is designed to pass both available customer information and itinerary/confirmation numbers to the supplier system. This allows the customer to fulfill the order at the location specified by the resort or attraction, according to embodiments of the present invention. According to some embodiments of the present invention, the core tier 204 performs transaction processing. Core tier 204 can process products that do not fall into the "activation" or "order processing" categories, such as, for example, direct product sales or access to resort programs like "resort charge," "voucher," and "loyalty." Data collected at the distribution point may then be translated into the supplier's system for normal processing at the resort property, according to embodiments of the present invention.

According to some embodiments of the present invention, the core tier 204 may further include various modules to perform services. For example, the core tier may include a message orchestration service module to communicate with the service distributors, and a message validation service module and a message automation service module in communication with the message orchestration service module. The message automation service module may be in communication with a message formatter, which can communicate in substantially real-time updates to a message delivery service module or in a staged fashion to a message queuing service module. The message delivery service module may deliver messages to one or more suppliers or suppliers' agents after receiving them from the message formatter module or the message queuing module, according to embodiments of the present invention.

One or more portions of the architecture of FIG. 2 may be implemented using a virtual machine, such as .NET from Microsoft™ Corporation, or Java Virtual Machine from Sun™. Data may be stored in databases in accordance with any number of database models, such as flat, hierarchical, network, relational, object-oriented, or others. By way of example, but not limitation, Microsoft Structured Query Language (SQL), MySQL, or Oracle™ databases may be used. Servers and their related services may be implemented using Microsoft's Internet Information Services (IIS) or Apache Hypertext Transport Protocol (HTTP) Servers, or others as appropriate to a particular implementation.

Figure 3:
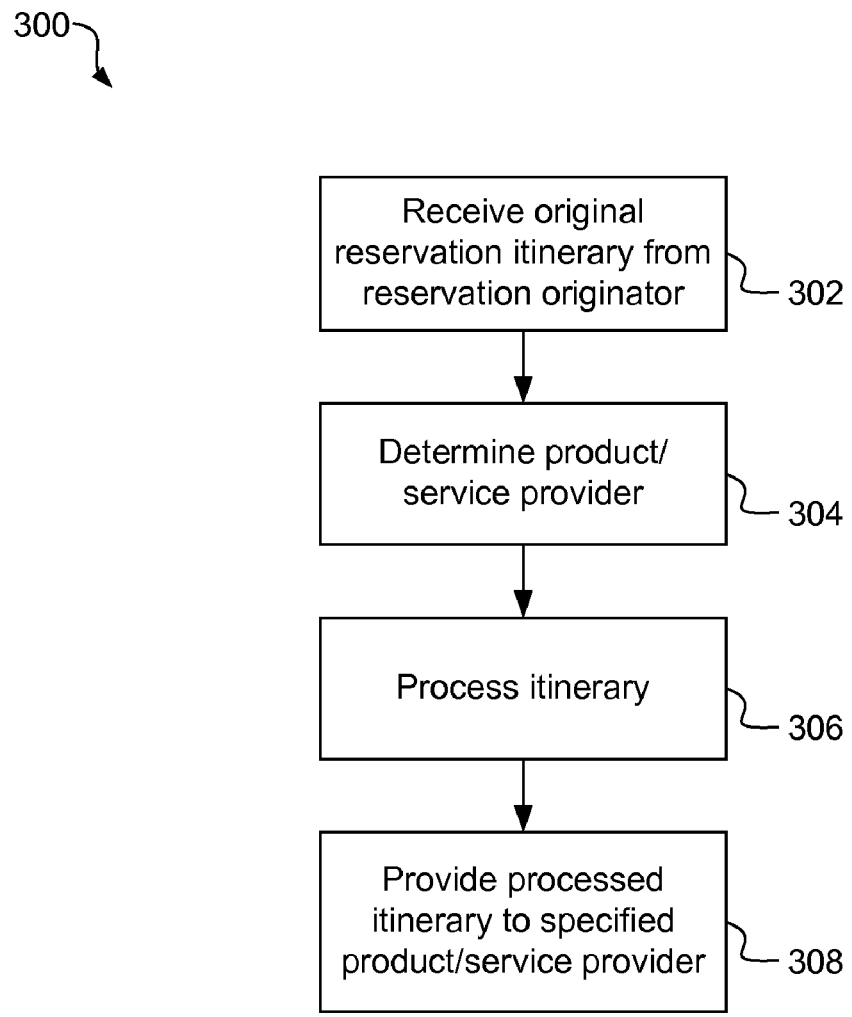
FIG. 3 is a flowchart illustrating a process for carrying out online reservations in accordance with an embodiment of the present invention.

FIG. 3 is a flowchart illustrating an exemplary reservation integration process 300 that may be carried out by a core tier (e.g., core tier 204, FIG. 2) of a reservation architecture in accordance with one embodiment. The process shown in FIG. 3 may be viewed as an intermediate process carried out between a reservation origination service (e.g., an online reservation service) and a product/service provider. The process of FIG. 3 can be used to bring together numerous different reservation originators and numerous different product/service providers in a coordinated and/or "seamless" fashion.

In a receiving operation 302 an original reservation itinerary is received from a reservation originator. The receiving operation 302 may involve adapting data or data formats communicated between the core tier and the reservation originator to facilitate communication of the original reservation to the core tier. In a determining operation 304 it is determined which product/service provider the received reservation applies to. The product/service provider is typically specified in the original reservation. The core tier is operable to read the original reservation to identify the specified product/service provider. Of course the reservation may include multiple product/service providers. In this case, all of the product/service providers are identified.

In a processing operation 306, data from the original reservation is processed to create a reservation that is compatible with the product/service provider(s) reservation or sales systems. In one embodiment, the processing operation 306 utilizes Extensible Markup Language (XML) schemas to perform the processing. The processing operation 306 may be viewed as a mapping from one reservation or itinerary format to another format. After the reservation is processed, a providing operation 308 provides the processed reservation to the appropriate product/service provider(s) system(s). In one embodiment, the providing operation 308 includes pushing the reservation to the appropriate system where it can be stored as an advanced sale in the provider's reservation/sales system.

According to some embodiments of the present invention, goods and/or services may be purchased for a piece of media 405 which evidences the purchase, rather than identifiable information of guest 102 which is then verified by the resort attendant 118 (as illustrated in embodiments of FIGS. 1-3). Use of media 405 according to embodiments of the present invention permits guest 102 to access goods and/or services at a venue directly, without having to provide additional proof of purchase and without having to redeem or exchange one form of media (bought at the store) with another form of media (useable at a supplier venue). For example, guests 102 currently must buy vouchers or gift cards for a certain company or type of goods or services, and upon arrival at the supplier venue, the guests 102 must often surrender and exchange the vouchers and/or gift cards for tokens or entry passes or other supplier-specific media used to access the goods or services. Embodiments of the present invention, however, permit activation of media 405 by an authorized media activation distributor to be translated into a record in the supplier's system which permits the media 405 to be used directly at the supplier venue to directly access the purchased goods and/or services.

Figure 4:
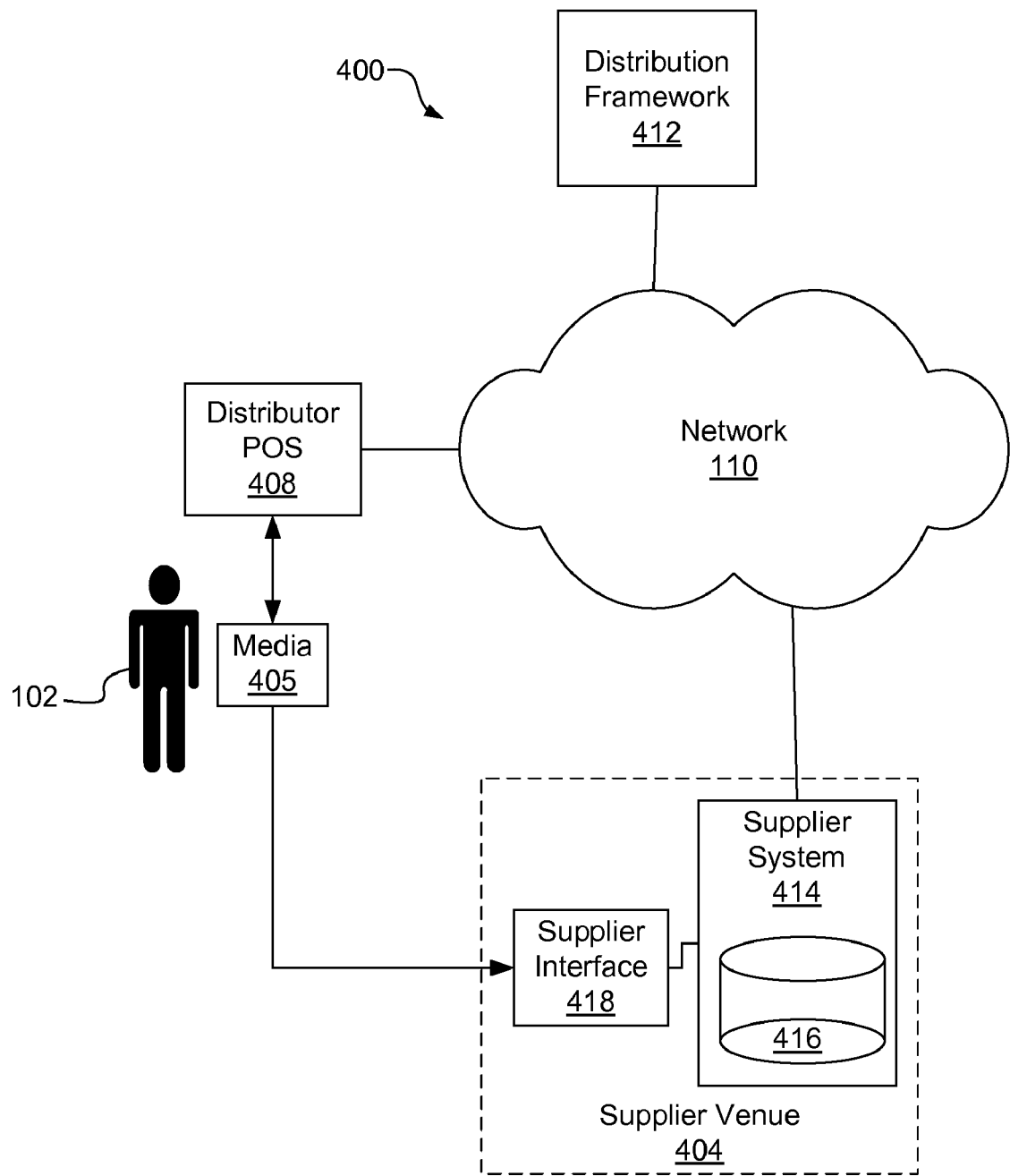
FIG. 4 illustrates an exemplary operating environment in which an online media activation framework may execute in accordance with an embodiment of the present invention.

FIG. 4 illustrates an exemplary operating environment 400 in which an integrated media activation architecture can execute in accordance with one embodiment. A guest 102 purchases a form of goods or services at a distributor point of sale 408, which activates a form of access media 405 retained by guest 102. According to some embodiments of the present invention, access media 405 stores a unique identification which may be activated to permit guest 102 to access the particular purchased goods or services of a supplier at a supplier venue 404. According to some embodiments of the present invention, the unique identification includes a number, a code, a key, and/or an electronic signature. Distributor POS 408 may be configured to accept guest's 102 payment for the goods or services, and to activate media 405 to permit media 405 to be used directly at supplier venue 404. Distributor POS 408 initiates activation of media 405 and makes the media activation available to a media activation distribution framework 412. The media activation distribution framework 412 processes the media activation and provides the processed media activation to a supplier sales system 414 of the supplier 404. The supplier system 414 typically stores the media activation in memory, such as a database 416.

Beneficially, the distribution framework 412 can perform pre-processing on the media activation to facilitate an integrated media activation process that is less error-prone and more trustworthy than conventional manual processes. For example, the distribution framework 412 can be designed to accept only legitimate media activations from authorized distributors and/or distributor POSs 408. In addition, the distribution framework 412 can process media activations from the distributor POS 408 by creating media activations that are in a format that is similar to, or compatible with, media activations used by the supplier system 414. In the embodiment of FIG. 4, the distribution framework 412 pushes the guest's 102 processed media activation to the supplier system 414, to thereby create a record of transaction in the supplier system 414. The pre-processing and record of transaction process has the beneficial effect of automatically performing or obviating steps in media activation and/or media redemption prior to the guest's 102 arrival at the supplier venue 404 that in conventional systems would have been carried out by resort staff manually.

To illustrate, after purchasing and/or activating the media 405, the guest 102 arrives at the supplier venue 404. The guest 102 does not need to have a sales receipt for the media 405 activation, or other document with her in order to make use of the media 405 to access the purchased goods and/or services. Furthermore, the guest 102 does not need to redeem or exchange the media 405 for another corresponding token or media used by supplier venue 404, because distribution framework 412 will have already provided supplier system 414 with the media activation information sufficient to update supplier system 414 and permit media 405 to be used to provide direct access to purchased goods or services at supplier venue 404. Because the media activation has been entered as a transaction, the media 405 is already in a format that is commonly used by, and readily understood by, one or more supplier interfaces 418 in communication with supplier systems 414 at supplier venue 404.

In accordance with one embodiment, the transaction corresponding to the activation of media 405 is reconciled with the supplier system 414 automatically. The supplier system 414 automatically submits the advance sale to the distributor POS 408 for payment.

Referring to the distributor POS 408 again, the distributor POS 408 can be any computing device operable to communicate over the network 110 with the distribution framework 412. By way of example, but without limitation, the distributor POS 408 could be a desktop computer, a laptop computer, a handheld computer, or a cell phone. The computer 408 includes functionality to communicate via one or more network protocols, such as Hypertext Transport Protocol (HTTP), Transmission Control Protocol/Internet Protocol (TCP/IP), File Transfer Protocol (FTP), and/or Simple Mail Transport Protocol (SMTP). The computer 408 may in some embodiments include a web browser application that can navigate web pages and present the web pages to the guest 102.

The network 110 may be composed of one or more networks and/or sub-networks. For example, the network 110 may be the Internet, which itself is composed of numerous sub-networks. The network 110 may include wired and wireless portions. The network may include switched networks, such as the Public Switched Telephone Network (PSTN) and Voice over Internet Protocol (VoIP) networks. The network 110 may include Local Area Networks (LANs), Wide Area Networks (WANs), backbone networks and others. In addition, one or more of the interactions among the systems in the network environment 400 may be carried out via one or more virtual private networks (VPN).

It will be understood that the embodiment shown in FIG. 4 is greatly simplified from an actual network environment for purposes of illustration. In actual operation, the network environment would include numerous guests, guest computers, online reservation systems, resorts, and potentially numerous distribution frameworks. As such, a distribution framework 412 can support numerous different distributor points of sale 408 and numerous different supplier systems 414. The capabilities of the distribution framework 412 can be leveraged among the numerous distributor points of sale systems as well as the numerous venues 404.

According to some embodiments of the present invention, media 405 is a plastic card with a magnetic strip which contains a unique identifier, and supplier interface 418 is a magnetic card reader which correlates the unique identifier with the media activation received in system 414 from distribution framework 412 to provide direct access to the purchased goods or services. According to other embodiments, media 405 contains a radio frequency identification (RFID) chip which is operable to transmit a unique identifier, and supplier interface 418 is an RFID receiver/transceiver operable to read the unique identifier from media 405. According to yet other embodiments, media 405 is an item which includes a bar code or other visual pattern with a unique configuration, and supplier interface 418 is a scanner operable to associate the unique configuration of the bar code or other visual pattern with the media activation received in system 414 from distribution framework 412.

Media 405 may also be a form of nontraditional media, such as a three-dimensional and/or non-flat media, according to embodiments of the present invention. Media 405 may be a replica or representation of a concept associated with supplier venue 404 and/or the goods or services offered by the supplier. For example, media 405 could be a small toy car containing an RFID chip which, upon activation of the media 405, could provide direct access at an entry turnstile to a professional car racing event. As another nonlimiting example, the media 405 could be distinctive toy building blocks imprinted with a bar code which, upon media activation using embodiments of the present invention, could be used to obtain entry to a theme park dedicated to the particular toy building blocks by presenting the building blocks (media 405) to a scanner at the theme park entrance. Embodiments of the present invention permit such distinctive and unique items to be used as media 405 to directly access purchased goods and/or services at a supplier venue 404, without having to be exchanged or redeemed.

Figure 5:
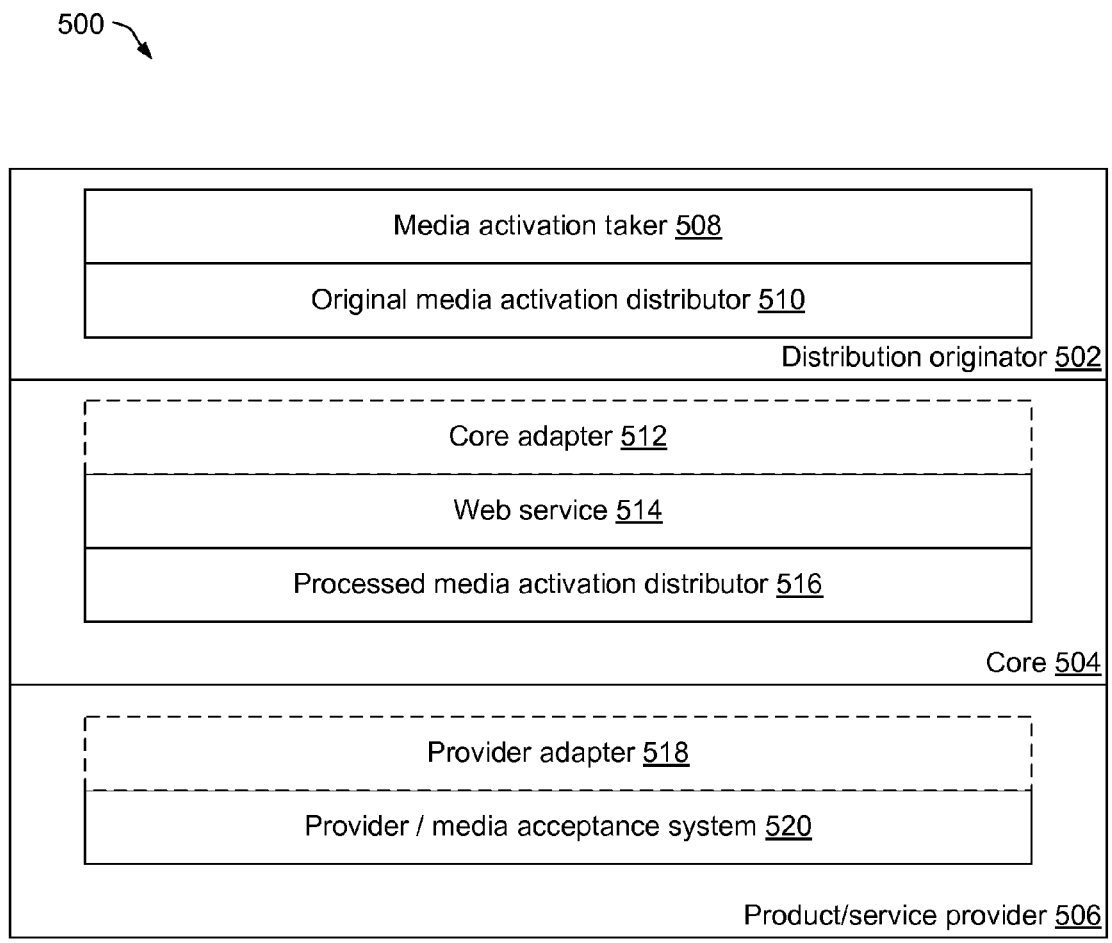
FIG. 5 illustrates a three-tier architecture for integrating an online media activation process in accordance with an embodiment of the present invention.

FIG. 5 illustrates an exemplary three-tier architecture 500 for providing end-to-end integrated media activation services. In this embodiment, the architecture 500 is composed of a distribution originator tier 502, a core tier 504, and a product/service provider tier 506. In one embodiment, the distributor POS 408 of FIG. 4 is configured to perform functions of and/or include modules associated with the distribution originator tier 502, the distribution framework 412 of FIG. 4 is configured to perform functions of and/or include modules associated with the core tier 504, and the supplier system 414 of FIG. 4 is configured to perform functions of and/or include modules associated with the product/service provider tier 506.

The distribution originator tier 502 includes a media activation taker module 508 and an original media activation distributor module 510. The media activation taker 508 interacts with another application or a user to take media activation information and produce an original media activation request that may be in the form of a document or other set of data in memory. Typically, the original media activation request has its own distinct format, such as the types of data included, the organization or order of the data, and so on. The original media activation distributor 510 makes the original media activation available to the core tier 504, for example by emailing the transaction to the core tier 504. Alternatively, the core tier 504 may retrieve the transaction from a designated location.

An optional core adapter 512 serves as an interface to the distribution originator 502. The core adapter 512 may be implemented to handle an interface protocol that is specific to the distribution originator 502. In other embodiments, the core adapter 512 may not be necessary, for example, where the distribution originator 502 includes a standard interface.

A web service 514 uses media activation data from the distribution originator 502 to create a media activation request that is compatible with the appropriate product/service provider 506. As such, web service 514 determines which product/service provider 506 is specified in the media activation and formats and/or reformats as necessary, a media activation request that has a format corresponding to the media activation format used by the product/service provider 506. After the original media activation request is processed by the web service 514, a core media activation distributor 516 distributes the processed media activation to the appropriate product/service provider 506.

The product/service provider 506 may interface with the core tier 504 via a provider adapter 518 that handles any special provider interface protocols as necessary. The provider/media acceptance system 520 is configured to receive and store the processed media activation. The provider/media acceptance system 520 is also operable to retrieve the media activation information when it is queried.

One or more portions of the architecture of FIG. 5 may be implemented using a virtual machine, such as .NET from Microsoft™ Corporation, or Java Virtual Machine from Sun™. Data may be stored in databases in accordance with any number of database models, such as flat, hierarchical, network, relational, object-oriented, or the like. By way of example, but not limitation, Microsoft Structured Query Language (SQL), MySQL, or Oracle™ databases may be used. Servers and their related services may be implemented using Microsoft's Internet Information Services (IIS) or Apache Hypertext Transport Protocol (HTTP) Servers, or others as appropriate to a particular implementation.

Figure 6:
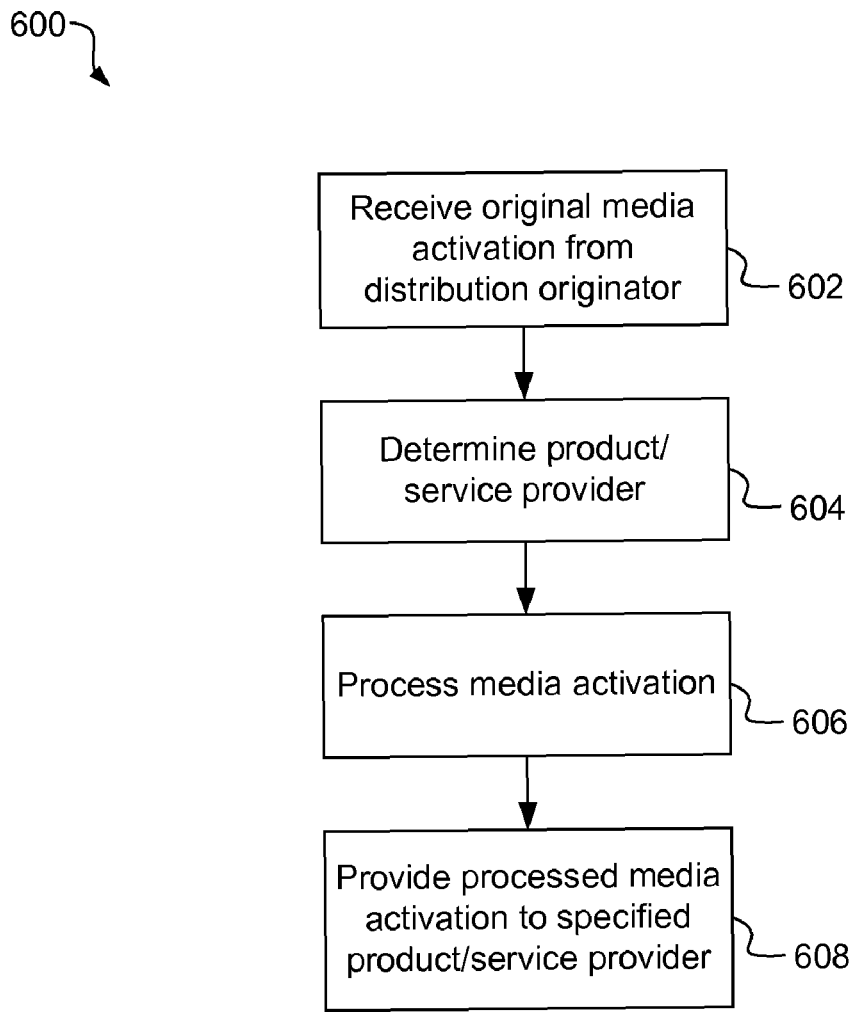
FIG. 6 is a flowchart illustrating a process for carrying out online media activations in accordance with an embodiment of the present invention.

FIG. 6 is a flowchart illustrating an exemplary media activation integration process 600 that may be carried out by a core tier (e.g., core tier 504, FIG. 5) of a media activation architecture in accordance with one embodiment. The process shown in FIG. 6 may be viewed as an intermediate process carried out between a distribution origination service (e.g., a distributor POS sale) and a product/service provider. The process of FIG. 6 can be used to bring together numerous different media activation originators and numerous different product/service providers in a coordinated and/or "seamless" fashion.

In a receiving operation 602 an original media activation is received from a distribution originator. The receiving operation 602 may involve adapting data or data formats communicated between the core tier and the media activation originator to facilitate communication of the original media activation to the core tier. In a determining operation 604 it is determined which product/service provider the received media activation applies to. The product/service provider is typically specified in the original media activation request received from the distribution originator. The core tier is operable to read the original media activation to identify the specified product/service provider. Of course the media activation may include multiple product/service providers. In this case, all of the product/service providers are identified.

In a processing operation 606, data from the original media activation is processed to create a media activation that is compatible with the product/service provider(s) reservation or sales systems. In one embodiment, the processing operation 606 utilizes Extensible Markup Language (XML) schemas to perform the processing. The processing operation 606 may be viewed as a mapping from one media activation or media format to another format. After the media activation is processed, a providing operation 608 provides the processed media activation to the appropriate product/service provider(s) system(s). In one embodiment, the providing operation 608 includes pushing the media activation to the appropriate system where it can be stored as a transaction in the provider's reservation/sales system.

Figure 7:
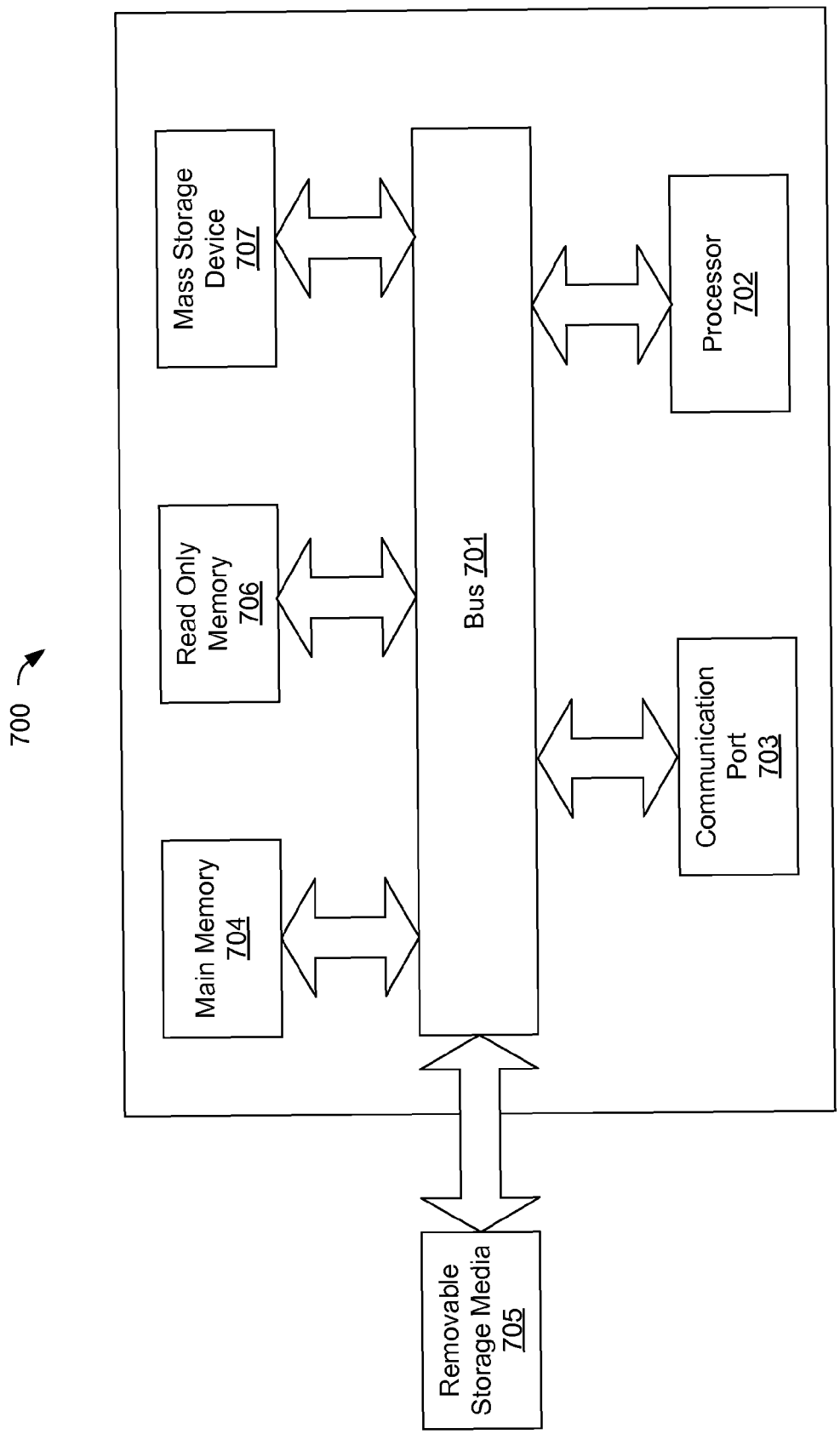
FIG. 7 depicts a general computing device upon which one or more portions of an integrated reservation framework can be implemented.

FIG. 7 depicts a general computing device upon which one or more portions of an integrated reservation system can be implemented and executed. The components computing device 700 are illustrative of components that client and server computers typically include. As such, the embodiments of the client application described herein can be implemented on the computing device 700. In any particular implementation, more or fewer than those components shown may exist. In addition, components shown may be combined or rearranged in any particular implementation, without departing from the scope of the present invention.

As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 700 includes a bus 701, at least one processor 702, at least one communication port 703, a main memory 704, a removable storage media 705 a read only memory 706, and a mass storage 707. Processor(s) 702 can be any know processor, such as, but not limited to, an Intel® Itanium® or Itanium 2® processor(s), or AMD® Opteron® or Athlon MP® processor(s), or Motorola® lines of processors. Communication port(s) 703 can be any of an RS-232 port for use with a modem based dialup connection, a 10/100 Ethernet port, a Gigabit port using copper or fiber, or a Universal Serial Bus (USB) port. Communication port(s) 703 may be chosen depending on a network such as a Local Area Network (LAN), Wide Area Network (WAN), or any network to which the computing device 700 connects. The computing device 700 may be in communication with peripheral devices (not shown) such as, but not limited to, printers, speakers, cameras, microphones, or scanners.

Main memory 704 can be Random Access Memory (RAM), or any other dynamic storage device(s) commonly known in the art. Read only memory 706 can be any static storage device(s) such as Programmable Read Only Memory (PROM) chips for storing static information such as instructions for processor 702. Mass storage 707 can be used to store information and instructions. For example, hard disks such as the Adaptec® family of SCSI drives, an optical disc, an array of disks such as RAID, such as the Adaptec family of RAID drives, or any other mass storage devices may be used.

Bus 701 communicatively couples processor(s) 702 with the other memory, storage and communication blocks. Bus 401 can be a PCI/PCI-X, SCSI, or USB based system bus (or other) depending on the storage devices used. Removable storage media 705 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Figure 8:
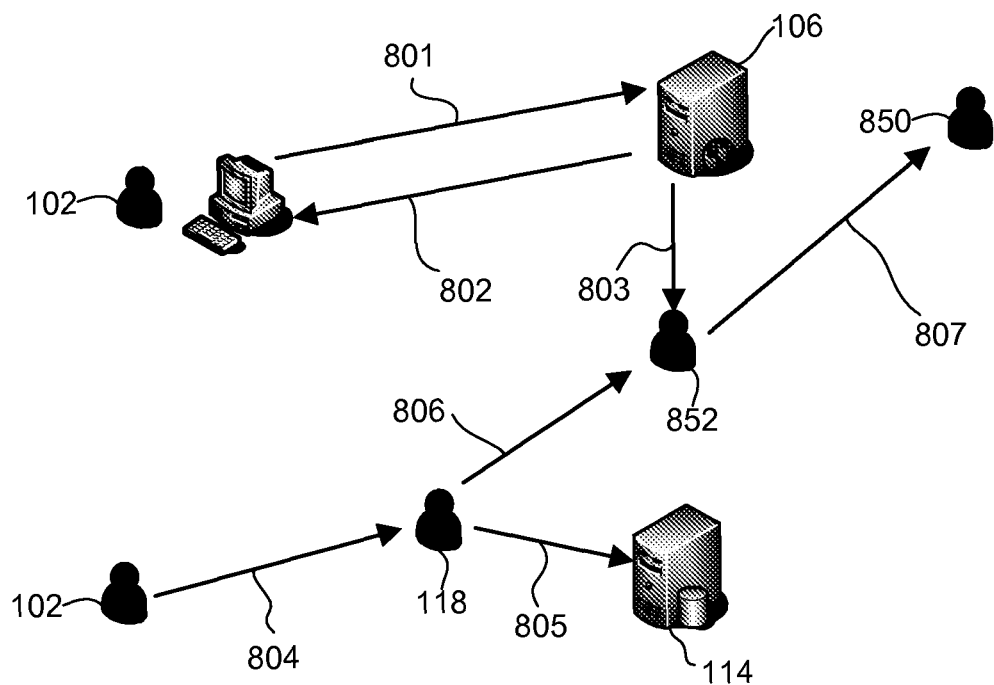
FIG. 8 depicts an exemplary operating environment illustrating a conventional reservation process.
Figure 9:
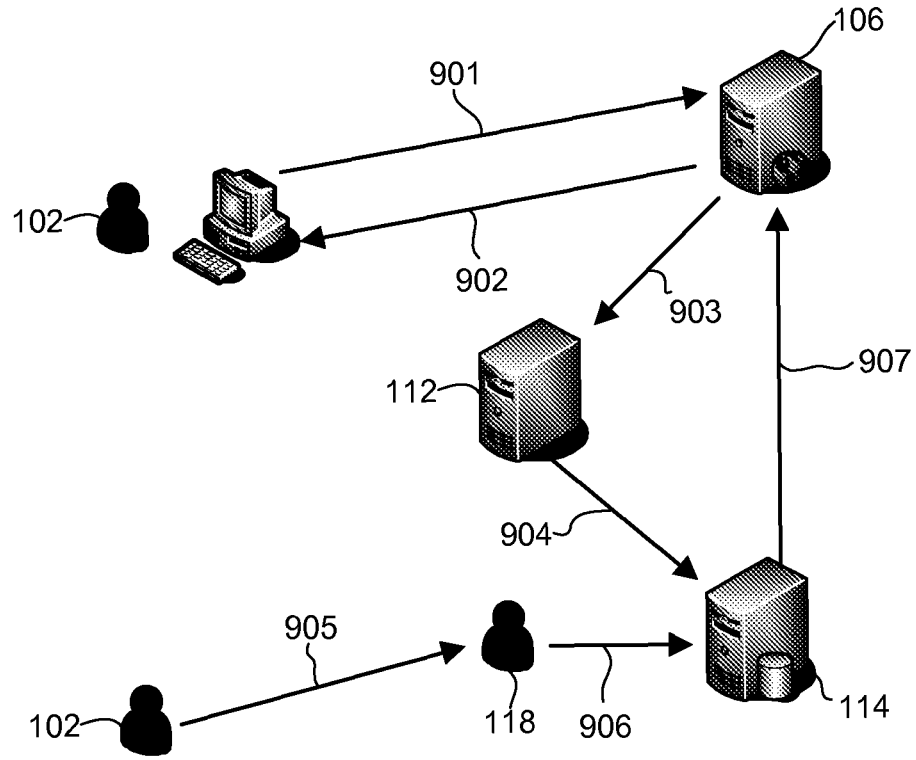
FIG. 9 depicts an exemplary operating environment illustrating a reservation process according to embodiments of the present invention.

FIGS. 8 and 9 compare a conventional reservation process with a reservation process according to embodiments of the present invention. FIG. 8 depicts an exemplary operating environment illustrating a conventional reservation process, and FIG. 9 depicts an exemplary operating environment illustrating a reservation process according to embodiments of the present invention. In the conventional process of FIG. 8, a guest 102 books a reservation on an online reservation system 106 (step 801). The online reservation system 106 then e-mails an itinerary to the guest 102 (step 802). The online reservation system 106 then e-mails the itinerary to a resort employee 852, who is usually in the accounting department of the resort (step 803). The guest 102 later arrives at the resort and presents a paper voucher to receive products booked through the online reservation system 106 (step 804). The resort employee 118 then attempts to locate the product represented on the guest's itinerary and posts a point-of-sale transaction (step 805). The resort operations employee 118 then submits a physical voucher to the accounting employee 852 as a backup for the transaction (step 806). The physical vouchers must then be reconciled and are physically mailed to the online reservation system employee 850 for payment (step 807).

In the streamlined process of the embodiment depicted in FIG. 9, a guest 102 books a reservation on an online reservation system 106 (step 901). The online reservation system 106 then e-mails an itinerary to the guest 102 (step 902). The distribution framework 112 then retrives the itinerary from the online reservation system 106 (step 903). The distribution framework 112 then processes and routes the itinerary to the resort system 114, creating an advanced sale in the resort system 114 (step 904). When the guest 102 arrives and identifies himself or herself to utilize products booked through the online reservation system 106 (step 905), the resort employee 118 locates and fulfills the advanced sale created in step 903 (step 906). The fulfilled advanced sales are then submitted to the online reservation system 106 for payment (step 907), according to embodiments of the present invention. A similar process may be used for a media activation system as described herein, to reduce risk associated with data integrity, fraud, and manual reconciliation. In the process of FIG. 8, all steps except for 901 and 902 involve direct human intervention, whereas in the process of FIG. 9, only steps 905 and 906 potentially involve direct human intervention, according to embodiments of the present invention. According to some embodiments of the present invention, data and/or price consistency is managed via automated processes, such as, for example, price discrepancy alerts, and manual processes like comparing reports from the distribution framework 112 to the resort system 114.

Schemas written in extended markup language ("XML") may be used to instruct a processor of a distribution framework, such as distribution framework 112, 412 according to embodiments of the present invention. The following illustrates non-limiting examples of XML schemas that may be employed for various purposes as described below. Based on the disclosure provided herein, one of ordinary skill in the art will appreciate that the structure, organization, and other attributes of the following XML schemas may vary in order to accomplish the purposes described below, and that some, all, or none of the following XML schemas may be used, according to embodiments of the present invention.

RTPDS_ActivateAccessMediaRQ—This schema defines a request to Activate Media valid for Access to a venue, goods or services, according to embodiments of the present invention.

```
<?xml version="1.0" encoding="UTF-8" standalone="yes"?>
<xs:schema xmlns:xs="http://www.w3.org/2001/XMLSchema">
  <xs:element name="RTPDS_ActivateAccessMediaRQ" type="RTPDS_ActivateAccessMediaRQ"/>
  <xs:complexType name="RTPDS_ActivateAccessMediaRQ">
    <xs:all>
      <xs:element name="SourceData" type="xs:string" minOccurs="0"/>
      <xs:element name="MediaCode" type="String1To255"/>
      <xs:element name="ProductCode" type="String1To255"/>
      <xs:element name="Price" type="Money"/>
      <xs:element name="CurrencyCode" type="CurrencyCode"/>
    </xs:all>
  </xs:complexType>
  <xs:simpleType name="stringPrimaryKey">
    <xs:annotation>
      <xs:documentation>A string primary key (1 - 32 characters long)</xs:documentation>
    </xs:annotation>
    <xs:restriction base="xs:string">
      <xs:minLength value="1"/>
      <xs:maxLength value="32"/>
      <xs:whiteSpace value="collapse"/>
    </xs:restriction>
  </xs:simpleType>
  <xs:simpleType name="intPrimaryKey">
    <xs:annotation>
      <xs:documentation>An integer primary key</xs:documentation>
    </xs:annotation>
    <xs:restriction base="xs:positiveInteger"/>
  </xs:simpleType>
  <xs:simpleType name="String1">
    <xs:annotation>
      <xs:documentation>A one character string (char)</xs:documentation>
    </xs:annotation>
    <xs:restriction base="xs:string">
      <xs:minLength value="1"/>
      <xs:maxLength value="8"/>
      <xs:whiteSpace value="collapse"/>
    </xs:restriction>
  </xs:simpleType>
  <xs:simpleType name="String1To8">
    <xs:annotation>
      <xs:documentation>A non-empty string, maximum length 8</xs:documentation>
    </xs:annotation>
  </xs:simpleType>
```

-continued

```
   <xs:restriction base="xs:string">
    <xs:minLength value="1"/>
    <xs:maxLength value="8"/>
    <xs:whiteSpace value="collapse"/>
   </xs:restriction>
  </xs:simpleType>
  <xs:simpleType name="String1To16">
   <xs:annotation>
    <xs:documentation>A non-empty string, maximum length 16</xs:documentation>
   </xs:annotation>
   <xs:restriction base="xs:string">
    <xs:minLength value="1"/>
    <xs:maxLength value="16"/>
    <xs:whiteSpace value="collapse"/>
   </xs:restriction>
  </xs:simpleType>
  <xs:simpleType name="String1To32">
   <xs:annotation>
    <xs:documentation>A non-empty string, maximum length 32</xs:documentation>
   </xs:annotation>
   <xs:restriction base="xs:string">
    <xs:minLength value="1"/>
    <xs:maxLength value="32"/>
    <xs:whiteSpace value="collapse"/>
   </xs:restriction>
  </xs:simpleType>
  <xs:simpleType name="String1To20">
   <xs:annotation>
    <xs:documentation>A non-empty string, maximum length 20</xs:documentation>
   </xs:annotation>
   <xs:restriction base="xs:string">
    <xs:minLength value="1"/>
    <xs:maxLength value="20"/>
    <xs:whiteSpace value="collapse"/>
   </xs:restriction>
  </xs:simpleType>
  <xs:simpleType name="String1To50">
   <xs:annotation>
    <xs:documentation>A non-empty string, maximum length 50</xs:documentation>
   </xs:annotation>
   <xs:restriction base="xs:string">
    <xs:minLength value="1"/>
    <xs:maxLength value="50"/>
    <xs:whiteSpace value="collapse"/>
   </xs:restriction>
  </xs:simpleType>
  <xs:simpleType name="String1To255">
   <xs:annotation>
    <xs:documentation>A non-empty string, maximum length 255</xs:documentation>
   </xs:annotation>
   <xs:restriction base="xs:string">
    <xs:minLength value="1"/>
    <xs:maxLength value="255"/>
    <xs:whiteSpace value="collapse"/>
   </xs:restriction>
  </xs:simpleType>
  <xs:simpleType name="String1To1000">
   <xs:annotation>
    <xs:documentation>A non-empty string, maximum length 1000</xs:documentation>
   </xs:annotation>
   <xs:restriction base="xs:string">
    <xs:minLength value="1"/>
    <xs:maxLength value="1000"/>
    <xs:whiteSpace value="collapse"/>
   </xs:restriction>
  </xs:simpleType>
  <xs:simpleType name="String1To5000">
   <xs:annotation>
    <xs:documentation>A non-empty string, maximum length 5000</xs:documentation>
   </xs:annotation>
   <xs:restriction base="xs:string">
    <xs:minLength value="1"/>
    <xs:maxLength value="1000"/>
    <xs:whiteSpace value="collapse"/>
   </xs:restriction>
  </xs:simpleType>
```

```
<xs:simpleType name="Money">
 <xs:annotation>
  <xs:documentation>A decimal value representing a dollar figure</xs:documentation>
 </xs:annotation>
 <xs:restriction base="xs:decimal">
  <xs:fractionDigits value="2" fixed="true"/>
 </xs:restriction>
</xs:simpleType>
<xs:simpleType name="Date">
 <xs:annotation>
  <xs:documentation>A valid date</xs:documentation>
 </xs:annotation>
 <xs:restriction base="xs:date">
  <xs:minInclusive value="1990-01-01"/>
  <xs:maxExclusive value="2100-01-01"/>
 </xs:restriction>
</xs:simpleType>
<xs:simpleType name="DateOfBirth">
 <xs:annotation>
  <xs:documentation>A valid date</xs:documentation>
 </xs:annotation>
 <xs:restriction base="xs:date">
  <xs:minInclusive value="1900-01-01"/>
  <xs:maxExclusive value="2100-01-01"/>
 </xs:restriction>
</xs:simpleType>
<xs:simpleType name="Indicator">
 <xs:restriction base="xs:string">
  <xs:enumeration value="Y"/>
  <xs:enumeration value="N"/>
 </xs:restriction>
</xs:simpleType>
<xs:simpleType name="Gender">
 <xs:restriction base="xs:string">
  <xs:enumeration value="M"/>
  <xs:enumeration value="F"/>
 </xs:restriction>
</xs:simpleType>
<xs:simpleType name="Target">
 <xs:restriction base="xs:string">
  <xs:enumeration value="Test"/>
  <xs:enumeration value="Stage"/>
  <xs:enumeration value="Production"/>
 </xs:restriction>
</xs:simpleType>
<xs:simpleType name="MessageType">
 <xs:restriction base="xs:string">
  <xs:enumeration value="Media" />
  <xs:enumeration value="Order" />
  <xs:enumeration value="Payment" />
 </xs:restriction>
</xs:simpleType>
<xs:simpleType name="MessageAction">
 <xs:restriction base="xs:string">
  <xs:enumeration value="ActivateAccessMedia" />
  <xs:enumeration value="InactivateAccessMedia" />
  <xs:enumeration value="ActivateValueMedia" />
  <xs:enumeration value="InactivateValueMedia" />
  <xs:enumeration value="CreditDebitValueMedia" />
  <xs:enumeration value="BalanceInquiryValueMedia" />
  <xs:enumeration value="CreateOrder" />
  <xs:enumeration value="CancelOrder" />
 </xs:restriction>
</xs:simpleType>
<xs:simpleType name="SecurityToken">
 <xs:annotation>
  <xs:documentation>A non-empty string, maximum length 1000</xs:documentation>
 </xs:annotation>
 <xs:restriction base="xs:string">
  <xs:minLength value="1"/>
  <xs:maxLength value="1000"/>
  <xs:whiteSpace value="collapse"/>
 </xs:restriction>
</xs:simpleType>
<xs:simpleType name="CurrencyCode">
 <xs:restriction base="xs:string">
  <!--Australia, Dollars-->
  <xs:enumeration value="AUD" />
  <!--Bahamas, Dollars-->
```

-continued

```
    <xs:enumeration value="BSD" />
    <!--Canada, Dollars-->
    <xs:enumeration value="CAD" />
    <!--Switzerland, Francs-->
    <xs:enumeration value="CHF" />
    <!--Euro-->
    <xs:enumeration value="EUR" />
    <!--United Kingdom, Pounds-->
    <xs:enumeration value="GBP" />
    <!--Caymam Islands, Dollars-->
    <xs:enumeration value="KYD" />
    <!--Mexico, Pesos-->
    <xs:enumeration value="MXN" />
    <!--New Zealand, Dollars-->
    <xs:enumeration value="NZD" />
    <!--United States of America, Dollars-->
    <xs:enumeration value="USD" />
  </xs:restriction>
 </xs:simpleType>
</xs:schema>
```

RTPDS_ActivateAccessMediaRS—This schema contains the response to a request to Activate Access Media, according to embodiments of the present invention.

```
<?xml version="1.0" encoding="UTF-8" standalone="yes"?>
<xs:schema xmlns:xs="http://www.w3.org/2001/XMLSchema">
  <xs:element name="RTPDS_ActivateAccessMediaRS"
type="RTPDS_ActivateAccessMediaRS"/>
  <xs:complexType name="RTPDS_ActivateAccessMediaRS">
    <xs:all>
      <xs:element name="ReturnCode" type="xs:positiveInteger"/>
      <xs:element name="ReturnMessage" type="String1To255"/>
    </xs:all>
  </xs:complexType>
  <xs:simpleType name="stringPrimaryKey">
    <xs:annotation>
      <xs:documentation>A string primary key (1 - 32 characters
long)</xs:documentation>
    </xs:annotation>
    <xs:restriction base="xs:string">
      <xs:minLength value="1"/>
      <xs:maxLength value="32"/>
      <xs:whiteSpace value="collapse"/>
    </xs:restriction>
  </xs:simpleType>
  <xs:simpleType name="intPrimaryKey">
    <xs:annotation>
      <xs:documentation>An integer primary key</xs:documentation>
    </xs:annotation>
    <xs:restriction base="xs:positiveInteger"/>
  </xs:simpleType>
  <xs:simpleType name="String1">
    <xs:annotation>
      <xs:documentation>A one character string
      (char)</xs:documentation>
    </xs:annotation>
    <xs:restriction base="xs:string">
      <xs:minLength value="1"/>
      <xs:maxLength value="8"/>
      <xs:whiteSpace value="collapse"/>
    </xs:restriction>
  </xs:simpleType>
  <xs:simpleType name="String1To8">
    <xs:annotation>
      <xs:documentation>A non-empty string, maximum
      length 8</xs:documentation>
    </xs:annotation>
    <xs:restriction base="xs:string">
      <xs:minLength value="1"/>
      <xs:maxLength value="8"/>
      <xs:whiteSpace value="collapse"/>
    </xs:restriction>
  </xs:simpleType>
```

-continued

```
  <xs:simpleType name="String1To16">
    <xs:annotation>
      <xs:documentation>A non-empty string, maximum
      length 16</xs:documentation>
    </xs:annotation>
    <xs:restriction base="xs:string">
      <xs:minLength value="1"/>
      <xs:maxLength value="16"/>
      <xs:whiteSpace value="collapse"/>
    </xs:restriction>
  </xs:simpleType>
  <xs:simpleType name="String1To32">
    <xs:annotation>
      <xs:documentation>A non-empty string, maximum
      length 32</xs:documentation>
    </xs:annotation>
    <xs:restriction base="xs:string">
      <xs:minLength value="1"/>
      <xs:maxLength value="32"/>
      <xs:whiteSpace value="collapse"/>
    </xs:restriction>
  </xs:simpleType>
  <xs:simpleType name="String1To20">
    <xs:annotation>
      <xs:documentation>A non-empty string, maximum
      length 20</xs:documentation>
    </xs:annotation>
    <xs:restriction base="xs:string">
      <xs:minLength value="1"/>
      <xs:maxLength value="20"/>
      <xs:whiteSpace value="collapse"/>
    </xs:restriction>
  </xs:simpleType>
  <xs:simpleType name="String1To50">
    <xs:annotation>
      <xs:documentation>A non-empty string, maximum
      length 50</xs:documentation>
    </xs:annotation>
    <xs:restriction base="xs:string">
      <xs:minLength value="1"/>
      <xs:maxLength value="50"/>
      <xs:whiteSpace value="collapse"/>
    </xs:restriction>
  </xs:simpleType>
  <xs:simpleType name="String1To255">
    <xs:annotation>
      <xs:documentation>A non-empty string, maximum
      length 255</xs:documentation>
    </xs:annotation>
```

```
    <xs:restriction base="xs:string">
        <xs:minLength value="1"/>
        <xs:maxLength value="255"/>
        <xs:whiteSpace value="collapse"/>
    </xs:restriction>
</xs:simpleType>
<xs:simpleType name="String1To1000">
    <xs:annotation>
        <xs:documentation>A non-empty string, maximum
        length 1000</xs:documentation>
    </xs:annotation>
    <xs:restriction base="xs:string">
        <xs:minLength value="1"/>
        <xs:maxLength value="1000"/>
        <xs:whiteSpace value="collapse"/>
    </xs:restriction>
</xs:simpleType>
<xs:simpleType name="String1To5000">
    <xs:annotation>
        <xs:documentation>A non-empty string, maximum
        length 5000</xs:documentation>
    </xs:annotation>
    <xs:restriction base="xs:string">
        <xs:minLength value="1"/>
        <xs:maxLength value="1000"/>
        <xs:whiteSpace value="collapse"/>
    </xs:restriction>
</xs:simpleType>
<xs:simpleType name="Money">
    <xs:annotation>
        <xs:documentation>A decimal value representing a dollar
figure</xs:documentation>
    </xs:annotation>
    <xs:restriction base="xs:decimal">
        <xs:fractionDigits value="2" fixed="true"/>
    </xs:restriction>
</xs:simpleType>
<xs:simpleType name="Date">
    <xs:annotation>
        <xs:documentation>A valid date</xs:documentation>
    </xs:annotation>
    <xs:restriction base="xs:date">
        <xs:minInclusive value="1990-01-01"/>
        <xs:maxExclusive value="2100-01-01"/>
    </xs:restriction>
</xs:simpleType>
<xs:simpleType name="DateOfBirth">
    <xs:annotation>
        <xs:documentation>A valid date</xs:documentation>
    </xs:annotation>
    <xs:restriction base="xs:date">
        <xs:minInclusive value="1900-01-01"/>
        <xs:maxExclusive value="2100-01-01"/>
    </xs:restriction>
</xs:simpleType>
<xs:simpleType name="Indicator">
    <xs:restriction base="xs:string">
        <xs:enumeration value="Y"/>
        <xs:enumeration value="N"/>
    </xs:restriction>
</xs:simpleType>
<xs:simpleType name="Gender">
    <xs:restriction base="xs:string">
        <xs:enumeration value="M"/>
        <xs:enumeration value="F"/>
    </xs:restriction>
</xs:simpleType>
<xs:simpleType name="Target">
    <xs:restriction base="xs:string">
        <xs:enumeration value="Test"/>
        <xs:enumeration value="Stage"/>
        <xs:enumeration value="Production"/>
    </xs:restriction>
</xs:simpleType>
<xs:simpleType name="MessageType">
    <xs:restriction base="xs:string">
        <xs:enumeration value="Media"/>
        <xs:enumeration value="Order"/>
        <xs:enumeration value="Payment"/>
    </xs:restriction>
</xs:simpleType>
<xs:simpleType name="MessageAction">
    <xs:restriction base="xs:string">
        <xs:enumeration value="ActivateAccessMedia"/>
        <xs:enumeration value="InactivateAccessMedia"/>
        <xs:enumeration value="ActivateValueMedia"/>
        <xs:enumeration value="InactivateValueMedia"/>
        <xs:enumeration value="CreditDebitValueMedia"/>
        <xs:enumeration value="BalanceInquiryValueMedia"/>
        <xs:enumeration value="CreateOrder"/>
        <xs:enumeration value="CancelOrder"/>
    </xs:restriction>
</xs:simpleType>
<xs:simpleType name="SecurityToken">
    <xs:annotation>
        <xs:documentation>A non-empty string, maximum
        length 1000</xs:documentation>
    </xs:annotation>
    <xs:restriction base="xs:string">
        <xs:minLength value="1"/>
        <xs:maxLength value="1000"/>
        <xs:whiteSpace value="collapse"/>
    </xs:restriction>
</xs:simpleType>
<xs:simpleType name="CurrencyCode">
    <xs:restriction base="xs:string">
        <!--Australia, Dollars-->
        <xs:enumeration value="AUD"/>
        <!--Bahamas, Dollars-->
        <xs:enumeration value="BSD"/>
        <!--Canada, Dollars-->
        <xs:enumeration value="CAD"/>
        <!--Switzerland, Francs-->
        <xs:enumeration value="CHF"/>
        <!--Euro-->
        <xs:enumeration value="EUR"/>
        <!--United Kingdom, Pounds-->
        <xs:enumeration value="GBP"/>
        <!--Caymam Islands, Dollars-->
        <xs:enumeration value="KYD"/>
        <!--Mexico, Pesos-->
        <xs:enumeration value="MXN"/>
        <!--New Zealand, Dollars-->
        <xs:enumeration value="NZD"/>
        <!--United States of America, Dollars-->
        <xs:enumeration value="USD"/>
    </xs:restriction>
</xs:simpleType>
</xs:schema>
```

RTPDS_ActivateValueMediaRQ—This schema defines a request to Activate Media valid for a denominated Value (dollar amount), according to embodiments of the present invention.

```
<?xml version="1.0" encoding="UTF-8" standalone="yes"?>
<xs:schema xmlns:xs="http://www.w3.org/2001/XMLSchema">
    <xs:element name="RTPDS_ActivateValueMediaRQ"
type="RTPDS_ActivateValueMediaRQ"/>
    <xs:complexType name="RTPDS_ActivateValueMediaRQ">
        <xs:all>
            <xs:element name="SourceData" type="xs:string"
            minOccurs="0"/>
            <xs:element name="MediaCode" type="String1To255"/>
            <xs:element name="ProductCode" type="String1To255"/>
            <xs:element name="Value" type="Money"/>
            <xs:element name="CurrencyCode" type="xs:positiveInteger"/>
        </xs:all>
    </xs:complexType>
```

```
<xs:simpleType name="stringPrimaryKey">
    <xs:annotation>
        <xs:documentation>A string primary key (1 - 32 characters long)</xs:documentation>
    </xs:annotation>
    <xs:restriction base="xs:string">
        <xs:minLength value="1"/>
        <xs:maxLength value="32"/>
        <xs:whiteSpace value="collapse"/>
    </xs:restriction>
</xs:simpleType>
<xs:simpleType name="intPrimaryKey">
    <xs:annotation>
        <xs:documentation>An integer primary key</xs:documentation>
    </xs:annotation>
    <xs:restriction base="xs:positiveInteger"/>
</xs:simpleType>
<xs:simpleType name="String1">
    <xs:annotation>
        <xs:documentation>A one character string (char)</xs:documentation>
    </xs:annotation>
    <xs:restriction base="xs:string">
        <xs:minLength value="1"/>
        <xs:maxLength value="8"/>
        <xs:whiteSpace value="collapse"/>
    </xs:restriction>
</xs:simpleType>
<xs:simpleType name="String1To8">
    <xs:annotation>
        <xs:documentation>A non-empty string, maximum length 8</xs:documentation>
    </xs:annotation>
    <xs:restriction base="xs:string">
        <xs:minLength value="1"/>
        <xs:maxLength value="8"/>
        <xs:whiteSpace value="collapse"/>
    </xs:restriction>
</xs:simpleType>
<xs:simpleType name="String1To16">
    <xs:annotation>
        <xs:documentation>A non-empty string, maximum length 16</xs:documentation>
    </xs:annotation>
    <xs:restriction base="xs:string">
        <xs:minLength value="1"/>
        <xs:maxLength value="16"/>
        <xs:whiteSpace value="collapse"/>
    </xs:restriction>
</xs:simpleType>
<xs:simpleType name="String1To32">
    <xs:annotation>
        <xs:documentation>A non-empty string, maximum length 32</xs:documentation>
    </xs:annotation>
    <xs:restriction base="xs:string">
        <xs:minLength value="1"/>
        <xs:maxLength value="32"/>
        <xs:whiteSpace value="collapse"/>
    </xs:restriction>
</xs:simpleType>
<xs:simpleType name="String1To20">
    <xs:annotation>
        <xs:documentation>A non-empty string, maximum length 20</xs:documentation>
    </xs:annotation>
    <xs:restriction base="xs:string">
        <xs:minLength value="1"/>
        <xs:maxLength value="20"/>
        <xs:whiteSpace value="collapse"/>
    </xs:restriction>
</xs:simpleType>
<xs:simpleType name="String1To50">
    <xs:annotation>
        <xs:documentation>A non-empty string, maximum length 50</xs:documentation>
    </xs:annotation>
    <xs:restriction base="xs:string">
        <xs:minLength value="1"/>
        <xs:maxLength value="50"/>
        <xs:whiteSpace value="collapse"/>
    </xs:restriction>
</xs:simpleType>
<xs:simpleType name="String1To255">
    <xs:annotation>
        <xs:documentation>A non-empty string, maximum length 255</xs:documentation>
    </xs:annotation>
    <xs:restriction base="xs:string">
        <xs:minLength value="1"/>
        <xs:maxLength value="255"/>
        <xs:whiteSpace value="collapse"/>
    </xs:restriction>
</xs:simpleType>
<xs:simpleType name="String1To1000">
    <xs:annotation>
        <xs:documentation>A non-empty string, maximum length 1000</xs:documentation>
    </xs:annotation>
    <xs:restriction base="xs:string">
        <xs:minLength value="1"/>
        <xs:maxLength value="1000"/>
        <xs:whiteSpace value="collapse"/>
    </xs:restriction>
</xs:simpleType>
<xs:simpleType name="String1To5000">
    <xs:annotation>
        <xs:documentation>A non-empty string, maximum length 5000</xs:documentation>
    </xs:annotation>
    <xs:restriction base="xs:string">
        <xs:minLength value="1"/>
        <xs:maxLength value="1000"/>
        <xs:whiteSpace value="collapse"/>
    </xs:restriction>
</xs:simpleType>
<xs:simpleType name="Money">
    <xs:annotation>
        <xs:documentation>A decimal value representing a dollar figure</xs:documentation>
    </xs:annotation>
    <xs:restriction base="xs:decimal">
        <xs:fractionDigits value="2" fixed="true"/>
    </xs:restriction>
</xs:simpleType>
<xs:simpleType name="Date">
    <xs:annotation>
        <xs:documentation>A valid date</xs:documentation>
    </xs:annotation>
    <xs:restriction base="xs:date">
        <xs:minInclusive value="1990-01-01"/>
        <xs:maxExclusive value="2100-01-01"/>
    </xs:restriction>
</xs:simpleType>
<xs:simpleType name="DateOfBirth">
    <xs:annotation>
        <xs:documentation>A valid date</xs:documentation>
    </xs:annotation>
    <xs:restriction base="xs:date">
        <xs:minInclusive value="1900-01-01"/>
        <xs:maxExclusive value="2100-01-01"/>
    </xs:restriction>
</xs:simpleType>
<xs:simpleType name="Indicator">
    <xs:restriction base="xs:string">
        <xs:enumeration value="Y"/>
        <xs:enumeration value="N"/>
    </xs:restriction>
</xs:simpleType>
<xs:simpleType name="Gender">
    <xs:restriction base="xs:string">
        <xs:enumeration value="M"/>
        <xs:enumeration value="F"/>
    </xs:restriction>
</xs:simpleType>
<xs:simpleType name="Target">
    <xs:restriction base="xs:string">
        <xs:enumeration value="Test"/>
        <xs:enumeration value="Stage"/>
        <xs:enumeration value="Production"/>
```

```
          </xs:restriction>
        </xs:simpleType>
        <xs:simpleType name="MessageType">
          <xs:restriction base="xs:string">
            <xs:enumeration value="Media" />
            <xs:enumeration value="Order" />
            <xs:enumeration value="Payment" />
          </xs:restriction>
        </xs:simpleType>
        <xs:simpleType name="MessageAction">
          <xs:restriction base="xs:string">
            <xs:enumeration value="ActivateAccessMedia" />
            <xs:enumeration value="InactivateAccessMedia" />
            <xs:enumeration value="ActivateValueMedia" />
            <xs:enumeration value="InactivateValueMedia" />
            <xs:enumeration value="CreditDebitValueMedia" />
            <xs:enumeration value="BalanceInquiryValueMedia" />
            <xs:enumeration value="CreateOrder" />
            <xs:enumeration value="CancelOrder" />
          </xs:restriction>
        </xs:simpleType>
        <xs:simpleType name="SecurityToken">
          <xs:annotation>
            <xs:documentation>A non-empty string, maximum
              length 1000</xs:documentation>
          </xs:annotation>
          <xs:restriction base="xs:string">
            <xs:minLength value="1"/>
            <xs:maxLength value="1000"/>
            <xs:whiteSpace value="collapse"/>
          </xs:restriction>
        </xs:simpleType>
        <xs:simpleType name="CurrencyCode">
          <xs:restriction base="xs:string">
            <!--Australia, Dollars-->
            <xs:enumeration value="AUD" />
            <!--Bahamas, Dollars-->
            <xs:enumeration value="BSD" />
            <!--Canada, Dollars-->
            <xs:enumeration value="CAD" />
            <!--Switzerland, Francs-->
            <xs:enumeration value="CHF" />
            <!--Euro-->
            <xs:enumeration value="EUR" />
            <!--United Kingdom, Pounds-->
            <xs:enumeration value="GBP" />
            <!--Caymam Islands, Dollars-->
            <xs:enumeration value="KYD" />
            <!--Mexico, Pesos-->
            <xs:enumeration value="MXN" />
            <!--New Zealand, Dollars-->
            <xs:enumeration value="NZD" />
            <!--United States of America, Dollars-->
            <xs:enumeration value="USD" />
          </xs:restriction>
        </xs:simpleType>
      </xs:schema>
```

RTPDS_ActivateValueMediaRS—This schema contains the response to a request to Activate Value Media, according to embodiments of the present invention.

```
<?xml version="1.0" encoding="UTF-8" standalone="yes"?>
<xs:schema xmlns:xs="http://www.w3.org/2001/XMLSchema">
  <xs:element name="RTPDS_ActivateValueMediaRS"
    type="RTPDS_ActivateValueMediaRS"/>
  <xs:complexType name="RTPDS_ActivateValueMediaRS">
    <xs:all>
      <xs:element name="ReturnCode" type="xs:string"
        minOccurs="1" maxOccurs="1"/>
      <xs:element name="ReturnText" type="xs:string"
        minOccurs="1" maxOccurs="1"/>
    </xs:all>
  </xs:complexType>
</xs:schema>
```

RTPDS_BalanceInquryValueMediaRQ—This schema defines a request to Check the Balance of Value Media, according to embodiments of the present invention.

```
<?xml version="1.0" encoding="UTF-8" standalone="yes"?>
<xs:schema xmlns:xs="http://www.w3.org/2001/XMLSchema">
  <xs:element name="RTPDS_BalanceInquiryValueMediaRQ"
    type="RTPDS_BalanceInquiryValueMediaRQ"/>
  <xs:complexType name="RTPDS_BalanceInquiryValueMediaRQ">
    <xs:all>
      <xs:element name="SourceData" type="xs:string"
        minOccurs="0"/>
      <xs:element name="MediaCode" type="String1To255"/>
      <xs:element name="ProductCode" type="String1To255"/>
      <xs:element name="CurrencyCode" type="CurrencyCode"/>
    </xs:all>
  </xs:complexType>
  <xs:simpleType name="stringPrimaryKey">
    <xs:annotation>
      <xs:documentation>A string primary key (1 - 32 characters
        long)</xs:documentation>
    </xs:annotation>
    <xs:restriction base="xs:string">
      <xs:minLength value="1"/>
      <xs:maxLength value="32"/>
      <xs:whiteSpace value="collapse"/>
    </xs:restriction>
  </xs:simpleType>
  <xs:simpleType name="intPrimaryKey">
    <xs:annotation>
      <xs:documentation>An integer primary key</xs:documentation>
    </xs:annotation>
    <xs:restriction base="xs:positiveInteger"/>
  </xs:simpleType>
  <xs:simpleType name="String1">
    <xs:annotation>
      <xs:documentation>A one character string
        (char)</xs:documentation>
    </xs:annotation>
    <xs:restriction base="xs:string">
      <xs:minLength value="1"/>
      <xs:maxLength value="8"/>
      <xs:whiteSpace value="collapse"/>
    </xs:restriction>
  </xs:simpleType>
  <xs:simpleType name="String1To8">
    <xs:annotation>
      <xs:documentation>A non-empty string, maximum
        length 8</xs:documentation>
    </xs:annotation>
    <xs:restriction base="xs:string">
      <xs:minLength value="1"/>
      <xs:maxLength value="8"/>
      <xs:whiteSpace value="collapse"/>
    </xs:restriction>
  </xs:simpleType>
  <xs:simpleType name="String1To16">
    <xs:annotation>
      <xs:documentation>A non-empty string, maximum
        length 16</xs:documentation>
    </xs:annotation>
    <xs:restriction base="xs:string">
      <xs:minLength value="1"/>
      <xs:maxLength value="16"/>
      <xs:whiteSpace value="collapse"/>
    </xs:restriction>
  </xs:simpleType>
  <xs:simpleType name="String1To32">
    <xs:annotation>
      <xs:documentation>A non-empty string, maximum
        length 32</xs:documentation>
    </xs:annotation>
    <xs:restriction base="xs:string">
      <xs:minLength value="1"/>
      <xs:maxLength value="32"/>
      <xs:whiteSpace value="collapse"/>
    </xs:restriction>
  </xs:simpleType>
```

```xml
<xs:simpleType name="String1To20">
  <xs:annotation>
    <xs:documentation>A non-empty string, maximum
      length 20</xs:documentation>
  </xs:annotation>
  <xs:restriction base="xs:string">
    <xs:minLength value="1"/>
    <xs:maxLength value="20"/>
    <xs:whiteSpace value="collapse"/>
  </xs:restriction>
</xs:simpleType>
<xs:simpleType name="String1To50">
  <xs:annotation>
    <xs:documentation>A non-empty string, maximum
      length 50</xs:documentation>
  </xs:annotation>
  <xs:restriction base="xs:string">
    <xs:minLength value="1"/>
    <xs:maxLength value="50"/>
    <xs:whiteSpace value="collapse"/>
  </xs:restriction>
</xs:simpleType>
<xs:simpleType name="String1To255">
  <xs:annotation>
    <xs:documentation>A non-empty string, maximum
      length 255</xs:documentation>
  </xs:annotation>
  <xs:restriction base="xs:string">
    <xs:minLength value="1"/>
    <xs:maxLength value="255"/>
    <xs:whiteSpace value="collapse"/>
  </xs:restriction>
</xs:simpleType>
<xs:simpleType name="String1To1000">
  <xs:annotation>
    <xs:documentation>A non-empty string, maximum
      length 1000</xs:documentation>
  </xs:annotation>
  <xs:restriction base="xs:string">
    <xs:minLength value="1"/>
    <xs:maxLength value="1000"/>
    <xs:whiteSpace value="collapse"/>
  </xs:restriction>
</xs:simpleType>
<xs:simpleType name="String1To5000">
  <xs:annotation>
    <xs:documentation>A non-empty string, maximum
      length 5000</xs:documentation>
  </xs:annotation>
  <xs:restriction base="xs:string">
    <xs:minLength value="1"/>
    <xs:maxLength value="1000"/>
    <xs:whiteSpace value="collapse"/>
  </xs:restriction>
</xs:simpleType>
<xs:simpleType name="Money">
  <xs:annotation>
    <xs:documentation>A decimal value representing a dollar figure</xs:documentation>
  </xs:annotation>
  <xs:restriction base="xs:decimal">
    <xs:fractionDigits value="2" fixed="true"/>
  </xs:restriction>
</xs:simpleType>
<xs:simpleType name="Date">
  <xs:annotation>
    <xs:documentation>A valid date</xs:documentation>
  </xs:annotation>
  <xs:restriction base="xs:date">
    <xs:minInclusive value="1990-01-01"/>
    <xs:maxExclusive value="2100-01-01"/>
  </xs:restriction>
</xs:simpleType>
<xs:simpleType name="DateOfBirth">
  <xs:annotation>
    <xs:documentation>A valid date</xs:documentation>
  </xs:annotation>
  <xs:restriction base="xs:date">
    <xs:minInclusive value="1900-01-01"/>
    <xs:maxExclusive value="2100-01-01"/>
  </xs:restriction>
</xs:simpleType>
<xs:simpleType name="Indicator">
  <xs:restriction base="xs:string">
    <xs:enumeration value="Y"/>
    <xs:enumeration value="N"/>
  </xs:restriction>
</xs:simpleType>
<xs:simpleType name="Gender">
  <xs:restriction base="xs:string">
    <xs:enumeration value="M"/>
    <xs:enumeration value="F"/>
  </xs:restriction>
</xs:simpleType>
<xs:simpleType name="Target">
  <xs:restriction base="xs:string">
    <xs:enumeration value="Test"/>
    <xs:enumeration value="Stage"/>
    <xs:enumeration value="Production"/>
  </xs:restriction>
</xs:simpleType>
<xs:simpleType name="MessageType">
  <xs:restriction base="xs:string">
    <xs:enumeration value="Media" />
    <xs:enumeration value="Order" />
    <xs:enumeration value="Payment" />
  </xs:restriction>
</xs:simpleType>
<xs:simpleType name="MessageAction">
  <xs:restriction base="xs:string">
    <xs:enumeration value="ActivateAccessMedia" />
    <xs:enumeration value="InactivateAccessMedia" />
    <xs:enumeration value="ActivateValueMedia" />
    <xs:enumeration value="InactivateValueMedia" />
    <xs:enumeration value="CreditDebitValueMedia" />
    <xs:enumeration value="BalanceInquiryValueMedia" />
    <xs:enumeration value="CreateOrder" />
    <xs:enumeration value="CancelOrder" />
  </xs:restriction>
</xs:simpleType>
<xs:simpleType name="SecurityToken">
  <xs:annotation>
    <xs:documentation>A non-empty string, maximum
      length 1000</xs:documentation>
  </xs:annotation>
  <xs:restriction base="xs:string">
    <xs:minLength value="1"/>
    <xs:maxLength value="1000"/>
    <xs:whiteSpace value="collapse"/>
  </xs:restriction>
</xs:simpleType>
<xs:simpleType name="CurrencyCode">
  <xs:restriction base="xs:string">
    <!--Australia, Dollars-->
    <xs:enumeration value="AUD" />
    <!--Bahamas, Dollars-->
    <xs:enumeration value="BSD" />
    <!--Canada, Dollars-->
    <xs:enumeration value="CAD" />
    <!--Switzerland, Francs-->
    <xs:enumeration value="CHF" />
    <!--Euro-->
    <xs:enumeration value="EUR" />
    <!--United Kingdom, Pounds-->
    <xs:enumeration value="GBP" />
    <!--Caymam Islands, Dollars-->
    <xs:enumeration value="KYD" />
    <!--Mexico, Pesos-->
    <xs:enumeration value="MXN" />
    <!--New Zealand, Dollars-->
    <xs:enumeration value="NZD" />
    <!--United States of America, Dollars-->
    <xs:enumeration value="USD" />
  </xs:restriction>
</xs:simpleType>
</xs:schema>
```

RTPDS_CancelOrderRQ—This schema defines a request to Cancel an Order (Advances Sale or Reservation), according to embodiments of the present invention.

```
<?xml version="1.0" encoding="UTF-8" standalone="yes"?>
<xs:schema xmlns:xs="http://www.w3.org/2001/XMLSchema">
  <xs:element name="RTPDS_CancelOrderRQ"
    type="RTPDS_CancelOrderRQ"/>
  <xs:complexType name="RTPDS_CancelOrderRQ">
    <xs:all>
      <!--Distributor Order Id (should be same as Distributor Reference Number from Header)-->
      <xs:element name="DistributorOrderId" type="String1To255"/>
    </xs:all>
  </xs:complexType>
  <xs:simpleType name="stringPrimaryKey">
    <xs:annotation>
      <xs:documentation>A string primary key (1 - 32 characters long)</xs:documentation>
    </xs:annotation>
    <xs:restriction base="xs:string">
      <xs:minLength value="1"/>
      <xs:maxLength value="32"/>
      <xs:whiteSpace value="collapse"/>
    </xs:restriction>
  </xs:simpleType>
  <xs:simpleType name="intPrimaryKey">
    <xs:annotation>
      <xs:documentation>An integer primary key</xs:documentation>
    </xs:annotation>
    <xs:restriction base="xs:positiveInteger"/>
  </xs:simpleType>
  <xs:simpleType name="String1">
    <xs:annotation>
      <xs:documentation>A one character string (char)</xs:documentation>
    </xs:annotation>
    <xs:restriction base="xs:string">
      <xs:minLength value="1"/>
      <xs:maxLength value="8"/>
      <xs:whiteSpace value="collapse"/>
    </xs:restriction>
  </xs:simpleType>
  <xs:simpleType name="String1To8">
    <xs:annotation>
      <xs:documentation>A non-empty string, maximum length 8</xs:documentation>
    </xs:annotation>
    <xs:restriction base="xs:string">
      <xs:minLength value="1"/>
      <xs:maxLength value="8"/>
      <xs:whiteSpace value="collapse"/>
    </xs:restriction>
  </xs:simpleType>
  <xs:simpleType name="String1To16">
    <xs:annotation>
      <xs:documentation>A non-empty string, maximum length 16</xs:documentation>
    </xs:annotation>
    <xs:restriction base="xs:string">
      <xs:minLength value="1"/>
      <xs:maxLength value="16"/>
      <xs:whiteSpace value="collapse"/>
    </xs:restriction>
  </xs:simpleType>
  <xs:simpleType name="String1To32">
    <xs:annotation>
      <xs:documentation>A non-empty string, maximum length 32</xs:documentation>
    </xs:annotation>
    <xs:restriction base="xs:string">
      <xs:minLength value="1"/>
      <xs:maxLength value="32"/>
      <xs:whiteSpace value="collapse"/>
    </xs:restriction>
  </xs:simpleType>
  <xs:simpleType name="String1To20">
    <xs:annotation>
      <xs:documentation>A non-empty string, maximum length 20</xs:documentation>
    </xs:annotation>
    <xs:restriction base="xs:string">
      <xs:minLength value="1"/>
      <xs:maxLength value="20"/>
      <xs:whiteSpace value="collapse"/>
    </xs:restriction>
  </xs:simpleType>
  <xs:simpleType name="String1To50">
    <xs:annotation>
      <xs:documentation>A non-empty string, maximum length 50</xs:documentation>
    </xs:annotation>
    <xs:restriction base="xs:string">
      <xs:minLength value="1"/>
      <xs:maxLength value="50"/>
      <xs:whiteSpace value="collapse"/>
    </xs:restriction>
  </xs:simpleType>
  <xs:simpleType name="String1To255">
    <xs:annotation>
      <xs:documentation>A non-empty string, maximum length 255</xs:documentation>
    </xs:annotation>
    <xs:restriction base="xs:string">
      <xs:minLength value="1"/>
      <xs:maxLength value="255"/>
      <xs:whiteSpace value="collapse"/>
    </xs:restriction>
  </xs:simpleType>
  <xs:simpleType name="String1To1000">
    <xs:annotation>
      <xs:documentation>A non-empty string, maximum length 1000</xs:documentation>
    </xs:annotation>
    <xs:restriction base="xs:string">
      <xs:minLength value="1"/>
      <xs:maxLength value="1000"/>
      <xs:whiteSpace value="collapse"/>
    </xs:restriction>
  </xs:simpleType>
  <xs:simpleType name="String1To5000">
    <xs:annotation>
      <xs:documentation>A non-empty string, maximum length 5000</xs:documentation>
    </xs:annotation>
    <xs:restriction base="xs:string">
      <xs:minLength value="1"/>
      <xs:maxLength value="1000"/>
      <xs:whiteSpace value="collapse"/>
    </xs:restriction>
  </xs:simpleType>
  <xs:simpleType name="Money">
    <xs:annotation>
      <xs:documentation>A decimal value representing a dollar figure</xs:documentation>
    </xs:annotation>
    <xs:restriction base="xs:decimal">
      <xs:fractionDigits value="2" fixed="true"/>
    </xs:restriction>
  </xs:simpleType>
  <xs:simpleType name="Date">
    <xs:annotation>
      <xs:documentation>A valid date</xs:documentation>
    </xs:annotation>
    <xs:restriction base="xs:date">
      <xs:minInclusive value="1990-01-01"/>
      <xs:maxExclusive value="2100-01-01"/>
    </xs:restriction>
  </xs:simpleType>
  <xs:simpleType name="DateOfBirth">
    <xs:annotation>
      <xs:documentation>A valid date</xs:documentation>
    </xs:annotation>
```

```
<xs:restriction base="xs:date">
    <xs:minInclusive value="1900-01-01"/>
    <xs:maxExclusive value="2100-01-01"/>
  </xs:restriction>
</xs:simpleType>
<xs:simpleType name="Indicator">
  <xs:restriction base="xs:string">
    <xs:enumeration value="Y"/>
    <xs:enumeration value="N"/>
  </xs:restriction>
</xs:simpleType>
<xs:simpleType name="Gender">
  <xs:restriction base="xs:string">
    <xs:enumeration value="M"/>
    <xs:enumeration value="F"/>
  </xs:restriction>
</xs:simpleType>
<xs:simpleType name="Target">
  <xs:restriction base="xs:string">
    <xs:enumeration value="Test"/>
    <xs:enumeration value="Stage"/>
    <xs:enumeration value="Production"/>
  </xs:restriction>
</xs:simpleType>
<xs:simpleType name="MessageType">
  <xs:restriction base="xs:string">
    <xs:enumeration value="Media" />
    <xs:enumeration value="Order" />
    <xs:enumeration value="Payment" />
  </xs:restriction>
</xs:simpleType>
<xs:simpleType name="MessageAction">
  <xs:restriction base="xs:string">
    <xs:enumeration value="ActivateAccessMedia" />
    <xs:enumeration value="InactivateAccessMedia" />
    <xs:enumeration value="ActivateValueMedia" />
    <xs:enumeration value="InactivateValueMedia" />
    <xs:enumeration value="CreditDebitValueMedia" />
    <xs:enumeration value="BalanceInquiryValueMedia" />
    <xs:enumeration value="CreateOrder" />
    <xs:enumeration value="CancelOrder" />
  </xs:restriction>
</xs:simpleType>
<xs:simpleType name="SecurityToken">
  <xs:annotation>
    <xs:documentation>A non-empty string, maximum
    length 1000</xs:documentation>
  </xs:annotation>
```

```
  <xs:restriction base="xs:string">
    <xs:minLength value="1"/>
    <xs:maxLength value="1000"/>
    <xs:whiteSpace value="collapse"/>
  </xs:restriction>
</xs:simpleType>
<xs:simpleType name="CurrencyCode">
  <xs:restriction base="xs:string">
    <!--Australia, Dollars-->
    <xs:enumeration value="AUD" />
    <!--Bahamas, Dollars-->
    <xs:enumeration value="BSD" />
    <!--Canada, Dollars-->
    <xs:enumeration value="CAD" />
    <!--Switzerland, Francs-->
    <xs:enumeration value="CHF" />
    <!--Euro-->
    <xs:enumeration value="EUR" />
    <!--United Kingdom, Pounds-->
    <xs:enumeration value="GBP" />
    <!--Caymam Islands, Dollars-->
    <xs:enumeration value="KYD" />
    <!--Mexico, Pesos-->
    <xs:enumeration value="MXN" />
    <!--New Zealand, Dollars-->
    <xs:enumeration value="NZD" />
    <!--United States of America, Dollars-->
    <xs:enumeration value="USD" />
  </xs:restriction>
</xs:simpleType>
</xs:schema>
```

RTPDS_CancelOrderRS—This schema contains the response to a request to Cancel an Order, according to embodiments of the present invention.

```
<?xml version="1.0" encoding="UTF-8" standalone="yes"?>
<xs:schema xmlns:xs="http://www.w3.org/2001/XMLSchema">
  <xs:element name="RTPDS_CancelOrderRS"
  type="RTPDS_CancelOrderRS"/>
  <xs:complexType name="RTPDS_CancelOrderRS">
    <xs:all>
      <xs:element name="ReturnCode" type="xs:string"/>
      <xs:element name="ReturnData" type="xs:string"/>
    </xs:all>
  </xs:complexType>
</xs:schema>
```

RTPDS_CreateOrderRQ—This schema defines a request to Create a New Order (Advanced Sale or Reservation), according to embodiments of the present

```
<?xml version="1.0" encoding="UTF-8" standalone="yes"?>
<xs:schema xmlns:xs="http://www.w3.org/2001/XMLSchema">
  <xs:element name="RTPDS_CreateOrderRQ" type="RTPDS_CreateOrderRQ"/>
  <xs:complexType name="RTPDS_CreateOrderRQ">
    <xs:all>
      <xs:element name="LineItems" type="LineItems"/>
      <xs:element name="Customer" type="Customer" minOccurs="0"/>
      <xs:element name="ArrivalDate" type="Date"/>
      <xs:element name="DepartureDate" type="Date"/>
    </xs:all>
  </xs:complexType>
  <xs:complexType name="Customer">
    <xs:all>
      <xs:element name="CustomerId" type="String1To255" minOccurs="0"/>
      <xs:element name="LastName" type="String1To255"/>
      <xs:element name="FirstName" type="String1To255"/>
      <xs:element name="MiddleName" type="String1To255" minOccurs="0"/>
      <xs:element name="Address" type="Address" minOccurs="0"/>
      <xs:element name="SourceCustomerNumber" type="String1To32" minOccurs="0"/>
      <xs:element name="Title" type="String1To255" minOccurs="0"/>
      <xs:element name="Suffix" type="String1To255" minOccurs="0"/>
```

```
            <xs:element name="Gender" type="Gender" minOccurs="0"/>
            <xs:element name="DateOfBirth" type="DateOfBirth" default="1950-01-01"
minOccurs="0"/>
            <xs:element name="HomePhone" type="String1To255" minOccurs="0"/>
            <xs:element name="CellPhone" type="String1To255" minOccurs="0"/>
            <xs:element name="EmailAddress" type="String1To255" minOccurs="0"/>
        </xs:all>
    </xs:complexType>
    <xs:complexType name="Address">
        <xs:annotation>
            <xs:documentation xml:lang="en">A street address
(AddressProfile)</xs:documentation>
        </xs:annotation>
        <xs:all>
            <xs:element name="Line1" type="String1To255" minOccurs="0"/>
            <xs:element name="Line2" type="String1To255" minOccurs="0"/>
            <xs:element name="Line3" type="String1To255" minOccurs="0"/>
            <xs:element name="City" type="String1To255"/>
            <xs:element name="StateProvince" type="String1To255"/>
            <xs:element name="PostalCode" type="String1To255" minOccurs="0"/>
            <xs:element name="Country" type="String1To255" minOccurs="0"/>
        </xs:all>
    </xs:complexType>
    <xs:complexType name="LineItems">
        <xs:sequence>
            <xs:element name="LineItem" type="LineItem" maxOccurs="unbounded"/>
        </xs:sequence>
    </xs:complexType>
    <xs:complexType name="LineItem">
        <xs:all>
            <xs:element name="ProductCode" type="String1To255"/>
            <xs:element name="ProductDate" type="Date"/>
            <xs:element name="Quantity" type="xs:decimal"/>
            <xs:element name="Price" type="Money"/>
            <xs:element name="ProductProperties" type="ProductProperties" minOccurs="0"/>
            <xs:element name="CurrencyCode" type="CurrencyCode"/>
        </xs:all>
    </xs:complexType>
    <xs:complexType name="ProductProperties">
        <xs:sequence>
            <xs:element name="ProductProperty" type="ProductProperty"
maxOccurs="unbounded"/>
        </xs:sequence>
    </xs:complexType>
    <xs:complexType name="ProductProperty">
        <xs:all>
            <xs:element name="Name" type="String1To255"/>
            <xs:element name="Value" type="String1To255"/>
        </xs:all>
    </xs:complexType>
    <xs:simpleType name="stringPrimaryKey">
        <xs:annotation>
            <xs:documentation>A string primary key (1 - 32 characters
long)</xs:documentation>
        </xs:annotation>
        <xs:restriction base="xs:string">
            <xs:minLength value="1"/>
            <xs:maxLength value="32"/>
            <xs:whiteSpace value="collapse"/>
        </xs:restriction>
    </xs:simpleType>
    <xs:simpleType name="intPrimaryKey">
        <xs:annotation>
            <xs:documentation>An integer primary key</xs:documentation>
        </xs:annotation>
        <xs:restriction base="xs:positiveInteger"/>
    </xs:simpleType>
    <xs:simpleType name="String1">
        <xs:annotation>
            <xs:documentation>A one character string (char)</xs:documentation>
        </xs:annotation>
        <xs:restriction base="xs:string">
            <xs:minLength value="1"/>
            <xs:maxLength value="8"/>
            <xs:whiteSpace value="collapse"/>
        </xs:restriction>
    </xs:simpleType>
```

-continued

```
<xs:simpleType name="String1To8">
  <xs:annotation>
    <xs:documentation>A non-empty string, maximum length 8</xs:documentation>
  </xs:annotation>
  <xs:restriction base="xs:string">
    <xs:minLength value="1"/>
    <xs:maxLength value="8"/>
    <xs:whiteSpace value="collapse"/>
  </xs:restriction>
</xs:simpleType>
<xs:simpleType name="String1To16">
  <xs:annotation>
    <xs:documentation>A non-empty string, maximum length 16</xs:documentation>
  </xs:annotation>
  <xs:restriction base="xs:string">
    <xs:minLength value="1"/>
    <xs:maxLength value="16"/>
    <xs:whiteSpace value="collapse"/>
  </xs:restriction>
</xs:simpleType>
<xs:simpleType name="String1To32">
  <xs:annotation>
    <xs:documentation>A non-empty string, maximum length 32</xs:documentation>
  </xs:annotation>
  <xs:restriction base="xs:string">
    <xs:minLength value="1"/>
    <xs:maxLength value="32"/>
    <xs:whiteSpace value="collapse"/>
  </xs:restriction>
</xs:simpleType>
<xs:simpleType name="String1To20">
  <xs:annotation>
    <xs:documentation>A non-empty string, maximum length 20</xs:documentation>
  </xs:annotation>
  <xs:restriction base="xs:string">
    <xs:minLength value="1"/>
    <xs:maxLength value="20"/>
    <xs:whiteSpace value="collapse"/>
  </xs:restriction>
</xs:simpleType>
<xs:simpleType name="String1To50">
  <xs:annotation>
    <xs:documentation>A non-empty string, maximum length 50</xs:documentation>
  </xs:annotation>
  <xs:restriction base="xs:string">
    <xs:minLength value="1"/>
    <xs:maxLength value="50"/>
    <xs:whiteSpace value="collapse"/>
  </xs:restriction>
</xs:simpleType>
<xs:simpleType name="String1To255">
  <xs:annotation>
    <xs:documentation>A non-empty string, maximum length 255</xs:documentation>
  </xs:annotation>
  <xs:restriction base="xs:string">
    <xs:minLength value="1"/>
    <xs:maxLength value="255"/>
    <xs:whiteSpace value="collapse"/>
  </xs:restriction>
</xs:simpleType>
<xs:simpleType name="String1To1000">
  <xs:annotation>
    <xs:documentation>A non-empty string, maximum length 1000</xs:documentation>
  </xs:annotation>
  <xs:restriction base="xs:string">
    <xs:minLength value="1"/>
    <xs:maxLength value="1000"/>
    <xs:whiteSpace value="collapse"/>
  </xs:restriction>
</xs:simpleType>
<xs:simpleType name="String1To5000">
  <xs:annotation>
    <xs:documentation>A non-empty string, maximum length 5000</xs:documentation>
  </xs:annotation>
  <xs:restriction base="xs:string">
    <xs:minLength value="1"/>
    <xs:maxLength value="1000"/>
    <xs:whiteSpace value="collapse"/>
  </xs:restriction>
</xs:simpleType>
```

```xml
<xs:simpleType name="Money">
    <xs:annotation>
        <xs:documentation>A decimal value representing a dollar figure</xs:documentation>
    </xs:annotation>
    <xs:restriction base="xs:decimal">
        <xs:fractionDigits value="2" fixed="true"/>
    </xs:restriction>
</xs:simpleType>
<xs:simpleType name="Date">
    <xs:annotation>
        <xs:documentation>A valid date</xs:documentation>
    </xs:annotation>
    <xs:restriction base="xs:date">
        <xs:minInclusive value="1990-01-01"/>
        <xs:maxExclusive value="2100-01-01"/>
    </xs:restriction>
</xs:simpleType>
<xs:simpleType name="DateOfBirth">
    <xs:annotation>
        <xs:documentation>A valid date</xs:documentation>
    </xs:annotation>
    <xs:restriction base="xs:date">
        <xs:minInclusive value="1900-01-01"/>
        <xs:maxExclusive value="2100-01-01"/>
    </xs:restriction>
</xs:simpleType>
<xs:simpleType name="Indicator">
    <xs:restriction base="xs:string">
        <xs:enumeration value="Y"/>
        <xs:enumeration value="N"/>
    </xs:restriction>
</xs:simpleType>
<xs:simpleType name="Gender">
    <xs:restriction base="xs:string">
        <xs:enumeration value="M"/>
        <xs:enumeration value="F"/>
    </xs:restriction>
</xs:simpleType>
<xs:simpleType name="Target">
    <xs:restriction base="xs:string">
        <xs:enumeration value="Test"/>
        <xs:enumeration value="Stage"/>
        <xs:enumeration value="Production"/>
    </xs:restriction>
</xs:simpleType>
<xs:simpleType name="MessageType">
    <xs:restriction base="xs:string">
        <xs:enumeration value="Media" />
        <xs:enumeration value="Order" />
        <xs:enumeration value="Payment" />
    </xs:restriction>
</xs:simpleType>
<xs:simpleType name="MessageAction">
    <xs:restriction base="xs:string">
        <xs:enumeration value="ActivateAccessMedia" />
        <xs:enumeration value="InactivateAccessMedia" />
        <xs:enumeration value="ActivateValueMedia" />
        <xs:enumeration value="InactivateValueMedia" />
        <xs:enumeration value="CreditDebitValueMedia" />
        <xs:enumeration value="BalanceInquiryValueMedia" />
        <xs:enumeration value="CreateOrder" />
        <xs:enumeration value="CancelOrder" />
    </xs:restriction>
</xs:simpleType>
<xs:simpleType name="SecurityToken">
    <xs:annotation>
        <xs:documentation>A non-empty string, maximum length 1000</xs:documentation>
    </xs:annotation>
    <xs:restriction base="xs:string">
        <xs:minLength value="1"/>
        <xs:maxLength value="1000"/>
        <xs:whiteSpace value="collapse"/>
    </xs:restriction>
</xs:simpleType>
<xs:simpleType name="CurrencyCode">
    <xs:restriction base="xs:string">
        <!--Australia, Dollars-->
        <xs:enumeration value="AUD" />
```

```
    <!--Bahamas, Dollars-->
    <xs:enumeration value="BSD" />
    <!--Canada, Dollars-->
    <xs:enumeration value="CAD" />
    <!--Switzerland, Francs-->
    <xs:enumeration value="CHF" />
    <!--Euro-->
    <xs:enumeration value="EUR" />
    <!--United Kingdom, Pounds-->
    <xs:enumeration value="GBP" />
    <!--Caymam Islands, Dollars-->
    <xs:enumeration value="KYD" />
    <!--Mexico, Pesos-->
    <xs:enumeration value="MXN" />
    <!--New Zealand, Dollars-->
    <xs:enumeration value="NZD" />
    <!--United States of America, Dollars-->
    <xs:enumeration value="USD" />
  </xs:restriction>
 </xs:simpleType>
</xs:schema>
```

RTPDS_CreateOrderRS—This schema contains the response to a request to Create a New Order, according to embodiments of the present invention.

```
<?xml version="1.0" encoding="UTF-8" standalone="yes"?>
<xs:schema xmlns:xs="http://www.w3.org/2001/XMLSchema">
  <xs:element name="RTPDS_CreateOrderRS"
    type="RTPDS_CreateOrderRS"/>
  <xs:complexType name="RTPDS_CreateOrderRS">
    <xs:all>
      <xs:element name="ReturnCode" type="xs:string"/>
      <xs:element name="ReturnText" type="xs:string"/>
    </xs:all>
  </xs:complexType>
</xs:schema>
```

RTPDS_CreditDebitValueMediaRQ—This schema defines a request to increment or decrement the Balance of Value Media, according to embodiments of the present invention.

```
<?xml version="1.0" encoding="UTF-8" standalone="yes"?>
<xs:schema xmlns:xs="http://www.w3.org/2001/XMLSchema">
  <xs:element name="RTPDS_CreditDebitValueMediaRQ"
    type="RTPDS_CreditDebitValueMediaRQ"/>
  <xs:complexType name="RTPDS_CreditDebitValueMediaRQ">
    <xs:all>
      <xs:element name="SourceData" type="xs:string" minOccurs="0"/>
      <xs:element name="MediaCode" type="String1To255"/>
      <xs:element name="ProductCode" type="String1To255"/>
      <xs:element name="CurrencyCode" type="CurrencyCode"/>
      <xs:element name="Amount" type="Money"/>
    </xs:all>
  </xs:complexType>
  <xs:simpleType name="stringPrimaryKey">
    <xs:annotation>
      <xs:documentation>A string primary key (1 - 32 characters long)</xs:documentation>
    </xs:annotation>
    <xs:restriction base="xs:string">
      <xs:minLength value="1"/>
      <xs:maxLength value="32"/>
      <xs:whiteSpace value="collapse"/>
    </xs:restriction>
  </xs:simpleType>
  <xs:simpleType name="intPrimaryKey">
    <xs:annotation>
      <xs:documentation>An integer primary key</xs:documentation>
    </xs:annotation>
    <xs:restriction base="xs:positiveInteger"/>
  </xs:simpleType>
  <xs:simpleType name="String1">
    <xs:annotation>
      <xs:documentation>A one character string (char)</xs:documentation>
    </xs:annotation>
```

-continued

```
    <xs:restriction base="xs:string">
        <xs:minLength value="1"/>
        <xs:maxLength value="8"/>
        <xs:whiteSpace value="collapse"/>
    </xs:restriction>
</xs:simpleType>
<xs:simpleType name="String1To8">
    <xs:annotation>
        <xs:documentation>A non-empty string, maximum length 8</xs:documentation>
    </xs:annotation>
    <xs:restriction base="xs:string">
        <xs:minLength value="1"/>
        <xs:maxLength value="8"/>
        <xs:whiteSpace value="collapse"/>
    </xs:restriction>
</xs:simpleType>
<xs:simpleType name="String1To16">
    <xs:annotation>
        <xs:documentation>A non-empty string, maximum length 16</xs:documentation>
    </xs:annotation>
    <xs:restriction base="xs:string">
        <xs:minLength value="1"/>
        <xs:maxLength value="16"/>
        <xs:whiteSpace value="collapse"/>
    </xs:restriction>
</xs:simpleType>
<xs:simpleType name="String1To32">
    <xs:annotation>
        <xs:documentation>A non-empty string, maximum length 32</xs:documentation>
    </xs:annotation>
    <xs:restriction base="xs:string">
        <xs:minLength value="1"/>
        <xs:maxLength value="32"/>
        <xs:whiteSpace value="collapse"/>
    </xs:restriction>
</xs:simpleType>
<xs:simpleType name="String1To20">
    <xs:annotation>
        <xs:documentation>A non-empty string, maximum length 20</xs:documentation>
    </xs:annotation>
    <xs:restriction base="xs:string">
        <xs:minLength value="1"/>
        <xs:maxLength value="20"/>
        <xs:whiteSpace value="collapse"/>
    </xs:restriction>
</xs:simpleType>
<xs:simpleType name="String1To50">
    <xs:annotation>
        <xs:documentation>A non-empty string, maximum length 50</xs:documentation>
    </xs:annotation>
    <xs:restriction base="xs:string">
        <xs:minLength value="1"/>
        <xs:maxLength value="50"/>
        <xs:whiteSpace value="collapse"/>
    </xs:restriction>
</xs:simpleType>
<xs:simpleType name="String1To255">
    <xs:annotation>
        <xs:documentation>A non-empty string, maximum length 255</xs:documentation>
    </xs:annotation>
    <xs:restriction base="xs:string">
        <xs:minLength value="1"/>
        <xs:maxLength value="255"/>
        <xs:whiteSpace value="collapse"/>
    </xs:restriction>
</xs:simpleType>
<xs:simpleType name="String1To1000">
    <xs:annotation>
        <xs:documentation>A non-empty string, maximum length 1000</xs:documentation>
    </xs:annotation>
    <xs:restriction base="xs:string">
        <xs:minLength value="1"/>
        <xs:maxLength value="1000"/>
        <xs:whiteSpace value="collapse"/>
    </xs:restriction>
</xs:simpleType>
<xs:simpleType name="String1To5000">
    <xs:annotation>
        <xs:documentation>A non-empty string, maximum length 5000</xs:documentation>
    </xs:annotation>
```

```
        <xs:restriction base="xs:string">
            <xs:minLength value="1"/>
            <xs:maxLength value="1000"/>
            <xs:whiteSpace value="collapse"/>
        </xs:restriction>
    </xs:simpleType>
    <xs:simpleType name="Money">
        <xs:annotation>
            <xs:documentation>A decimal value representing a dollar figure</xs:documentation>
        </xs:annotation>
        <xs:restriction base="xs:decimal">
            <xs:fractionDigits value="2" fixed="true"/>
        </xs:restriction>
    </xs:simpleType>
    <xs:simpleType name="Date">
        <xs:annotation>
            <xs:documentation>A valid date</xs:documentation>
        </xs:annotation>
        <xs:restriction base="xs:date">
            <xs:minInclusive value="1990-01-01"/>
            <xs:maxExclusive value="2100-01-01"/>
        </xs:restriction>
    </xs:simpleType>
    <xs:simpleType name="DateOfBirth">
        <xs:annotation>
            <xs:documentation>A valid date</xs:documentation>
        </xs:annotation>
        <xs:restriction base="xs:date">
            <xs:minInclusive value="1900-01-01"/>
            <xs:maxExclusive value="2100-01-01"/>
        </xs:restriction>
    </xs:simpleType>
    <xs:simpleType name="Indicator">
        <xs:restriction base="xs:string">
            <xs:enumeration value="Y"/>
            <xs:enumeration value="N"/>
        </xs:restriction>
    </xs:simpleType>
    <xs:simpleType name="Gender">
        <xs:restriction base="xs:string">
            <xs:enumeration value="M"/>
            <xs:enumeration value="F"/>
        </xs:restriction>
    </xs:simpleType>
    <xs:simpleType name="Target">
        <xs:restriction base="xs:string">
            <xs:enumeration value="Test"/>
            <xs:enumeration value="Stage"/>
            <xs:enumeration value="Production"/>
        </xs:restriction>
    </xs:simpleType>
    <xs:simpleType name="MessageType">
        <xs:restriction base="xs:string">
            <xs:enumeration value="Media" />
            <xs:enumeration value="Order" />
            <xs:enumeration value="Payment" />
        </xs:restriction>
    </xs:simpleType>
    <xs:simpleType name="MessageAction">
        <xs:restriction base="xs:string">
            <xs:enumeration value="ActivateAccessMedia" />
            <xs:enumeration value="InactivateAccessMedia" />
            <xs:enumeration value="ActivateValueMedia" />
            <xs:enumeration value="InactivateValueMedia" />
            <xs:enumeration value="CreditDebitValueMedia" />
            <xs:enumeration value="BalanceInquiryValueMedia" />
            <xs:enumeration value="CreateOrder" />
            <xs:enumeration value="CancelOrder" />
        </xs:restriction>
    </xs:simpleType>
    <xs:simpleType name="SecurityToken">
        <xs:annotation>
            <xs:documentation>A non-empty string, maximum length 1000</xs:documentation>
        </xs:annotation>
        <xs:restriction base="xs:string">
            <xs:minLength value="1"/>
            <xs:maxLength value="1000"/>
            <xs:whiteSpace value="collapse"/>
        </xs:restriction>
```

```
</xs:simpleType>
<xs:simpleType name="CurrencyCode">
   <xs:restriction base="xs:string">
      <!--Australia, Dollars-->
      <xs:enumeration value="AUD" />
      <!--Bahamas, Dollars-->
      <xs:enumeration value="BSD" />
      <!--Canada, Dollars-->
      <xs:enumeration value="CAD" />
      <!--Switzerland, Francs-->
      <xs:enumeration value="CHF" />
      <!--Euro-->
      <xs:enumeration value="EUR" />
      <!--United Kingdom, Pounds-->
      <xs:enumeration value="GBP" />
      <!--Caymam Islands, Dollars-->
      <xs:enumeration value="KYD" />
      <!--Mexico, Pesos-->
      <xs:enumeration value="MXN" />
      <!--New Zealand, Dollars-->
      <xs:enumeration value="NZD" />
      <!--United States of America, Dollars-->
      <xs:enumeration value="USD" />
   </xs:restriction>
</xs:simpleType>
</xs:schema>
```

RTPDS_Header—This schema defines a standard Distribution Services message, according to embodiments of the present invention.

```
<?xml version="1.0" encoding="UTF-8" standalone="yes"?>
<xs:schema xmlns:xs="http://www.w3.org/2001/XMLSchema">
   <xs:element name="RTPDS_Header" type="RTPDS_Header"/>
   <xs:complexType name="RTPDS_Header">
      <xs:all>
         <!--Security Token/Credential-->
         <xs:element name="SessionId" type="xs:string"/>
         <!--Id provided by caller for this message-->
         <xs:element name="SourceMessageId" type="String1To255"/>
         <!--Corresponds to the Processor/Formatter to handle this message-->
         <xs:element name="RTPDS_MessageType" type="MessageType"/>
         <!--Corresponds to the Processor/Formatter to handle this message-->
         <xs:element name="RTPDS_MessageAction" type="MessageAction"/>
         <!--Distributor Identification-->
         <xs:element name="DistributorCode" type="xs:positiveInteger"/>
         <xs:element name="DistributorName" type="String1To255"/>
         <!--Supplier Identification-->
         <xs:element name="SupplierCode" type="xs:positiveInteger" minOccurs="0"/>
         <xs:element name="SupplierName" type="String1To255" minOccurs="0"/>
         <!--Test/Production-->
         <xs:element name="Target" type="Target"/>
         <xs:element name="DateTime" type="DateTime"/>
         <!--Distributor's Id for this message/transaction-->
         <xs:element name="DistributorReferenceNumber" type="String1To255"/>
         <!--Message Body-->
         <xs:element name="RTPDS_MessageBody"/>
         <!--Original Raw Data-->
         <xs:element name="SourceMessage"/>
      </xs:all>
   </xs:complexType>
   <xs:simpleType name="stringPrimaryKey">
      <xs:annotation>
         <xs:documentation>A string primary key (1 - 32 characters long)</xs:documentation>
      </xs:annotation>
      <xs:restriction base="xs:string">
         <xs:minLength value="1"/>
         <xs:maxLength value="32"/>
         <xs:whiteSpace value="collapse"/>
      </xs:restriction>
   </xs:simpleType>
```

```
<xs:simpleType name="intPrimaryKey">
  <xs:annotation>
    <xs:documentation>An integer primary key</xs:documentation>
  </xs:annotation>
  <xs:restriction base="xs:positiveInteger"/>
</xs:simpleType>
<xs:simpleType name="String1">
  <xs:annotation>
    <xs:documentation>A one character string (char)</xs:documentation>
  </xs:annotation>
  <xs:restriction base="xs:string">
    <xs:minLength value="1"/>
    <xs:maxLength value="8"/>
    <xs:whiteSpace value="collapse"/>
  </xs:restriction>
</xs:simpleType>
<xs:simpleType name="String1To8">
  <xs:annotation>
    <xs:documentation>A non-empty string, maximum length 8</xs:documentation>
  </xs:annotation>
  <xs:restriction base="xs:string">
    <xs:minLength value="1"/>
    <xs:maxLength value="8"/>
    <xs:whiteSpace value="collapse"/>
  </xs:restriction>
</xs:simpleType>
<xs:simpleType name="String1To16">
  <xs:annotation>
    <xs:documentation>A non-empty string, maximum length 16</xs:documentation>
  </xs:annotation>
  <xs:restriction base="xs:string">
    <xs:minLength value="1"/>
    <xs:maxLength value="16"/>
    <xs:whiteSpace value="collapse"/>
  </xs:restriction>
</xs:simpleType>
<xs:simpleType name="String1To32">
  <xs:annotation>
    <xs:documentation>A non-empty string, maximum length 32</xs:documentation>
  </xs:annotation>
  <xs:restriction base="xs:string">
    <xs:minLength value="1"/>
    <xs:maxLength value="32"/>
    <xs:whiteSpace value="collapse"/>
  </xs:restriction>
</xs:simpleType>
<xs:simpleType name="String1To20">
  <xs:annotation>
    <xs:documentation>A non-empty string, maximum length 20</xs:documentation>
  </xs:annotation>
  <xs:restriction base="xs:string">
    <xs:minLength value="1"/>
    <xs:maxLength value="20"/>
    <xs:whiteSpace value="collapse"/>
  </xs:restriction>
</xs:simpleType>
<xs:simpleType name="String1To50">
  <xs:annotation>
    <xs:documentation>A non-empty string, maximum length 50</xs:documentation>
  </xs:annotation>
  <xs:restriction base="xs:string">
    <xs:minLength value="1"/>
    <xs:maxLength value="50"/>
    <xs:whiteSpace value="collapse"/>
  </xs:restriction>
</xs:simpleType>
<xs:simpleType name="String1To255">
  <xs:annotation>
    <xs:documentation>A non-empty string, maximum length 255</xs:documentation>
  </xs:annotation>
  <xs:restriction base="xs:string">
    <xs:minLength value="1"/>
    <xs:maxLength value="255"/>
    <xs:whiteSpace value="collapse"/>
  </xs:restriction>
</xs:simpleType>
<xs:simpleType name="String1To1000">
  <xs:annotation>
    <xs:documentation>A non-empty string, maximum length 1000</xs:documentation>
  </xs:annotation>
```

```xml
        <xs:restriction base="xs:string">
            <xs:minLength value="1"/>
            <xs:maxLength value="1000"/>
            <xs:whiteSpace value="collapse"/>
        </xs:restriction>
    </xs:simpleType>
    <xs:simpleType name="String1To5000">
        <xs:annotation>
            <xs:documentation>A non-empty string, maximum length 5000</xs:documentation>
        </xs:annotation>
        <xs:restriction base="xs:string">
            <xs:minLength value="1"/>
            <xs:maxLength value="1000"/>
            <xs:whiteSpace value="collapse"/>
        </xs:restriction>
    </xs:simpleType>
    <xs:simpleType name="Money">
        <xs:annotation>
            <xs:documentation>A decimal value representing a dollar figure</xs:documentation>
        </xs:annotation>
        <xs:restriction base="xs:decimal">
            <xs:fractionDigits value="2" fixed="true"/>
        </xs:restriction>
    </xs:simpleType>
    <xs:simpleType name="Date">
        <xs:annotation>
            <xs:documentation>A valid date</xs:documentation>
        </xs:annotation>
        <xs:restriction base="xs:date">
            <xs:minInclusive value="1990-01-01"/>
            <xs:maxExclusive value="2100-01-01"/>
        </xs:restriction>
    </xs:simpleType>
    <xs:simpleType name="DateTime">
        <xs:annotation>
            <xs:documentation>A valid date</xs:documentation>
        </xs:annotation>
        <xs:restriction base="xs:dateTime">
            <xs:minInclusive value="1990-01-01T12:00:00"/>
            <xs:maxExclusive value="2100-01-01T12:00:00"/>
        </xs:restriction>
    </xs:simpleType>
    <xs:simpleType name="DateOfBirth">
        <xs:annotation>
            <xs:documentation>A valid date</xs:documentation>
        </xs:annotation>
        <xs:restriction base="xs:date">
            <xs:minInclusive value="1900-01-01"/>
            <xs:maxExclusive value="2100-01-01"/>
        </xs:restriction>
    </xs:simpleType>
    <xs:simpleType name="Indicator">
        <xs:restriction base="xs:string">
            <xs:enumeration value="Y"/>
            <xs:enumeration value="N"/>
        </xs:restriction>
    </xs:simpleType>
    <xs:simpleType name="Gender">
        <xs:restriction base="xs:string">
            <xs:enumeration value="M"/>
            <xs:enumeration value="F"/>
        </xs:restriction>
    </xs:simpleType>
    <xs:simpleType name="Target">
        <xs:restriction base="xs:string">
            <xs:enumeration value="Test"/>
            <xs:enumeration value="Stage"/>
            <xs:enumeration value="Production"/>
        </xs:restriction>
    </xs:simpleType>
    <xs:simpleType name="MessageType">
        <xs:restriction base="xs:string">
            <xs:enumeration value="System" />
            <xs:enumeration value="Media" />
            <xs:enumeration value="Order" />
            <xs:enumeration value="Payment" />
        </xs:restriction>
    </xs:simpleType>
```

-continued

```
<xs:simpleType name="MessageAction">
    <xs:restriction base="xs:string">
        <xs:enumeration value="System" />
        <xs:enumeration value="ActivateAccessMedia" />
        <xs:enumeration value="InactivateAccessMedia" />
        <xs:enumeration value="ActivateValueMedia" />
        <xs:enumeration value="InactivateValueMedia" />
        <xs:enumeration value="CreditDebitValueMedia" />
        <xs:enumeration value="BalanceInquiryValueMedia" />
        <xs:enumeration value="CreateOrder" />
        <xs:enumeration value="CancelOrder" />
    </xs:restriction>
</xs:simpleType>
<xs:simpleType name="SessionId">
    <xs:annotation>
        <xs:documentation>A non-empty string, maximum length 1000</xs:documentation>
    </xs:annotation>
    <xs:restriction base="xs:string">
        <xs:minLength value="1"/>
        <xs:maxLength value="1000"/>
        <xs:whiteSpace value="collapse"/>
    </xs:restriction>
</xs:simpleType>
<xs:simpleType name="CurrencyCode">
    <xs:restriction base="xs:string">
        <!--Australia, Dollars-->
        <xs:enumeration value="AUD" />
        <!--Bahamas, Dollars-->
        <xs:enumeration value="BSD" />
        <!--Canada, Dollars-->
        <xs:enumeration value="CAD" />
        <!--Switzerland, Francs-->
        <xs:enumeration value="CHF" />
        <!--Euro-->
        <xs:enumeration value="EUR" />
        <!--United Kingdom, Pounds-->
        <xs:enumeration value="GBP" />
        <!--Caymam Islands, Dollars-->
        <xs:enumeration value="KYD" />
        <!--Mexico, Pesos-->
        <xs:enumeration value="MXN" />
        <!--New Zealand, Dollars-->
        <xs:enumeration value="NZD" />
        <!--United States of America, Dollars-->
        <xs:enumeration value="USD" />
    </xs:restriction>
</xs:simpleType>
</xs:schema>
```

RTPDS_InactiveAccessMediaRQ—This schema defines a request to Inactivate Access Media, according to embodiments of the present invention.

```
<?xml version="1.0" encoding="UTF-8" standalone="yes"?>
<xs:schema xmlns:xs="http://www.w3.org/2001/XMLSchema">
    <xs:element name="RTPDS_InactiveAccessMediaRQ" type="RTPDS_InactiveAccessMediaRQ"/>
    <xs:complexType name="RTPDS_InactiveAccessMediaRQ">
        <xs:all>
            <xs:element name="SourceData" type="xs:string" minOccurs="0"/>
            <xs:element name="MediaCode" type="String1To255"/>
            <xs:element name="ProductCode" type="String1To255"/>
            <xs:element name="CurrencyCode" type="CurrencyCode"/>
        </xs:all>
    </xs:complexType>
    <xs:simpleType name="stringPrimaryKey">
        <xs:annotation>
            <xs:documentation>A string primary key (1 - 32 characters long)</xs:documentation>
        </xs:annotation>
```

-continued

```
      <xs:restriction base="xs:string">
        <xs:minLength value="1"/>
        <xs:maxLength value="32"/>
        <xs:whiteSpace value="collapse"/>
      </xs:restriction>
    </xs:simpleType>
    <xs:simpleType name="intPrimaryKey">
      <xs:annotation>
        <xs:documentation>An integer primary key</xs:documentation>
      </xs:annotation>
      <xs:restriction base="xs:positiveInteger"/>
    </xs:simpleType>
    <xs:simpleType name="String1">
      <xs:annotation>
        <xs:documentation>A one character string (char)</xs:documentation>
      </xs:annotation>
      <xs:restriction base="xs:string">
        <xs:minLength value="1"/>
        <xs:maxLength value="8"/>
        <xs:whiteSpace value="collapse"/>
      </xs:restriction>
    </xs:simpleType>
    <xs:simpleType name="String1To8">
      <xs:annotation>
        <xs:documentation>A non-empty string, maximum length 8</xs:documentation>
      </xs:annotation>
      <xs:restriction base="xs:string">
        <xs:minLength value="1"/>
        <xs:maxLength value="8"/>
        <xs:whiteSpace value="collapse"/>
      </xs:restriction>
    </xs:simpleType>
    <xs:simpleType name="String1To16">
      <xs:annotation>
        <xs:documentation>A non-empty string, maximum length 16</xs:documentation>
      </xs:annotation>
      <xs:restriction base="xs:string">
        <xs:minLength value="1"/>
        <xs:maxLength value="16"/>
        <xs:whiteSpace value="collapse"/>
      </xs:restriction>
    </xs:simpleType>
    <xs:simpleType name="String1To32">
      <xs:annotation>
        <xs:documentation>A non-empty string, maximum length 32</xs:documentation>
      </xs:annotation>
      <xs:restriction base="xs:string">
        <xs:minLength value="1"/>
        <xs:maxLength value="32"/>
        <xs:whiteSpace value="collapse"/>
      </xs:restriction>
    </xs:simpleType>
    <xs:simpleType name="String1To20">
      <xs:annotation>
        <xs:documentation>A non-empty string, maximum length 20</xs:documentation>
      </xs:annotation>
      <xs:restriction base="xs:string">
        <xs:minLength value="1"/>
        <xs:maxLength value="20"/>
        <xs:whiteSpace value="collapse"/>
      </xs:restriction>
    </xs:simpleType>
    <xs:simpleType name="String1To50">
      <xs:annotation>
        <xs:documentation>A non-empty string, maximum length 50</xs:documentation>
      </xs:annotation>
      <xs:restriction base="xs:string">
        <xs:minLength value="1"/>
        <xs:maxLength value="50"/>
        <xs:whiteSpace value="collapse"/>
      </xs:restriction>
    </xs:simpleType>
    <xs:simpleType name="String1To255">
      <xs:annotation>
        <xs:documentation>A non-empty string, maximum length 255</xs:documentation>
      </xs:annotation>
```

```
            <xs:restriction base="xs:string">
                <xs:minLength value="1"/>
                <xs:maxLength value="255"/>
                <xs:whiteSpace value="collapse"/>
            </xs:restriction>
        </xs:simpleType>
        <xs:simpleType name="String1To1000">
            <xs:annotation>
                <xs:documentation>A non-empty string, maximum length 1000</xs:documentation>
            </xs:annotation>
            <xs:restriction base="xs:string">
                <xs:minLength value="1"/>
                <xs:maxLength value="1000"/>
                <xs:whiteSpace value="collapse"/>
            </xs:restriction>
        </xs:simpleType>
        <xs:simpleType name="String1To5000">
            <xs:annotation>
                <xs:documentation>A non-empty string, maximum length 5000</xs:documentation>
            </xs:annotation>
            <xs:restriction base="xs:string">
                <xs:minLength value="1"/>
                <xs:maxLength value="1000"/>
                <xs:whiteSpace value="collapse"/>
            </xs:restriction>
        </xs:simpleType>
        <xs:simpleType name="Money">
            <xs:annotation>
                <xs:documentation>A decimal value representing a dollar figure</xs:documentation>
            </xs:annotation>
            <xs:restriction base="xs:decimal">
                <xs:fractionDigits value="2" fixed="true"/>
            </xs:restriction>
        </xs:simpleType>
        <xs:simpleType name="Date">
            <xs:annotation>
                <xs:documentation>A valid date</xs:documentation>
            </xs:annotation>
            <xs:restriction base="xs:date">
                <xs:minInclusive value="1990-01-01"/>
                <xs:maxExclusive value="2100-01-01"/>
            </xs:restriction>
        </xs:simpleType>
        <xs:simpleType name="DateOfBirth">
            <xs:annotation>
                <xs:documentation>A valid date</xs:documentation>
            </xs:annotation>
            <xs:restriction base="xs:date">
                <xs:minInclusive value="1900-01-01"/>
                <xs:maxExclusive value="2100-01-01"/>
            </xs:restriction>
        </xs:simpleType>
        <xs:simpleType name="Indicator">
            <xs:restriction base="xs:string">
                <xs:enumeration value="Y"/>
                <xs:enumeration value="N"/>
            </xs:restriction>
        </xs:simpleType>
        <xs:simpleType name="Gender">
            <xs:restriction base="xs:string">
                <xs:enumeration value="M"/>
                <xs:enumeration value="F"/>
            </xs:restriction>
        </xs:simpleType>
        <xs:simpleType name="Target">
            <xs:restriction base="xs:string">
                <xs:enumeration value="Test"/>
                <xs:enumeration value="Stage"/>
                <xs:enumeration value="Production"/>
            </xs:restriction>
        </xs:simpleType>
        <xs:simpleType name="MessageType">
            <xs:restriction base="xs:string">
                <xs:enumeration value="Media" />
                <xs:enumeration value="Order" />
                <xs:enumeration value="Payment" />
            </xs:restriction>
        </xs:simpleType>
        <xs:simpleType name="MessageAction">
```

```
            <xs:restriction base="xs:string">
                <xs:enumeration value="ActivateAccessMedia" />
                <xs:enumeration value="InactivateAccessMedia" />
                <xs:enumeration value="ActivateValueMedia" />
                <xs:enumeration value="InactivateValueMedia" />
                <xs:enumeration value="CreditDebitValueMedia" />
                <xs:enumeration value="BalanceInquiryValueMedia" />
                <xs:enumeration value="CreateOrder" />
                <xs:enumeration value="CancelOrder" />
            </xs:restriction>
    </xs:simpleType>
    <xs:simpleType name="SecurityToken">
        <xs:annotation>
            <xs:documentation>A non-empty string, maximum length 1000</xs:documentation>
        </xs:annotation>
        <xs:restriction base="xs:string">
            <xs:minLength value="1"/>
            <xs:maxLength value="1000"/>
            <xs:whiteSpace value="collapse"/>
        </xs:restriction>
    </xs:simpleType>
    <xs:simpleType name="CurrencyCode">
        <xs:restriction base="xs:string">
            <!--Australia, Dollars-->
            <xs:enumeration value="AUD" />
            <!--Bahamas, Dollars-->
            <xs:enumeration value="BSD" />
            <!--Canada, Dollars-->
            <xs:enumeration value="CAD" />
            <!--Switzerland, Francs-->
            <xs:enumeration value="CHF" />
            <!--Euro-->
            <xs:enumeration value="EUR" />
            <!--United Kingdom, Pounds-->
            <xs:enumeration value="GBP" />
            <!--Caymam Islands, Dollars-->
            <xs:enumeration value="KYD" />
            <!--Mexico, Pesos-->
            <xs:enumeration value="MXN" />
            <!--New Zealand, Dollars-->
            <xs:enumeration value="NZD" />
            <!--United States of America, Dollars-->
            <xs:enumeration value="USD" />
        </xs:restriction>
    </xs:simpleType>
</xs:schema>
```

RTPDS_ActivateAccessMediaRQ—This schema defines a request to Inactivate Value Media.

```
<?xml version="1.0" encoding="UTF-8" standalone="yes"?>
<xs:schema xmlns:xs="http://www.w3.org/2001/XMLSchema">
    <xs:element name="RTPDS_InactivateValueMediaRQ" type="RTPDS_InactivateValueMediaRQ"/>
    <xs:complexType name="RTPDS_InactivateValueMediaRQ">
        <xs:all>
            <xs:element name="SourceData" type="xs:string" minOccurs="0"/>
            <xs:element name="MediaCode" type="String1To255"/>
            <xs:element name="ProductCode" type="String1To255"/>
            <xs:element name="CurrencyCode" type="CurrencyCode"/>
        </xs:all>
    </xs:complexType>
    <xs:simpleType name="stringPrimaryKey">
        <xs:annotation>
            <xs:documentation>A string primary key (1 - 32 characters long)</xs:documentation>
        </xs:annotation>
        <xs:restriction base="xs:string">
            <xs:minLength value="1"/>
            <xs:maxLength value="32"/>
            <xs:whiteSpace value="collapse"/>
        </xs:restriction>
    </xs:simpleType>
```

```
<xs:simpleType name="intPrimaryKey">
  <xs:annotation>
    <xs:documentation>An integer primary key</xs:documentation>
  </xs:annotation>
  <xs:restriction base="xs:positiveInteger"/>
</xs:simpleType>
<xs:simpleType name="String1">
  <xs:annotation>
    <xs:documentation>A one character string (char)</xs:documentation>
  </xs:annotation>
  <xs:restriction base="xs:string">
    <xs:minLength value="1"/>
    <xs:maxLength value="8"/>
    <xs:whiteSpace value="collapse"/>
  </xs:restriction>
</xs:simpleType>
<xs:simpleType name="String1To8">
  <xs:annotation>
    <xs:documentation>A non-empty string, maximum length 8</xs:documentation>
  </xs:annotation>
  <xs:restriction base="xs:string">
    <xs:minLength value="1"/>
    <xs:maxLength value="8"/>
    <xs:whiteSpace value="collapse"/>
  </xs:restriction>
</xs:simpleType>
<xs:simpleType name="String1To16">
  <xs:annotation>
    <xs:documentation>A non-empty string, maximum length 16</xs:documentation>
  </xs:annotation>
  <xs:restriction base="xs:string">
    <xs:minLength value="1"/>
    <xs:maxLength value="16"/>
    <xs:whiteSpace value="collapse"/>
  </xs:restriction>
</xs:simpleType>
<xs:simpleType name="String1To32">
  <xs:annotation>
    <xs:documentation>A non-empty string, maximum length 32</xs:documentation>
  </xs:annotation>
  <xs:restriction base="xs:string">
    <xs:minLength value="1"/>
    <xs:maxLength value="32"/>
    <xs:whiteSpace value="collapse"/>
  </xs:restriction>
</xs:simpleType>
<xs:simpleType name="String1To20">
  <xs:annotation>
    <xs:documentation>A non-empty string, maximum length 20</xs:documentation>
  </xs:annotation>
  <xs:restriction base="xs:string">
    <xs:minLength value="1"/>
    <xs:maxLength value="20"/>
    <xs:whiteSpace value="collapse"/>
  </xs:restriction>
</xs:simpleType>
<xs:simpleType name="String1To50">
  <xs:annotation>
    <xs:documentation>A non-empty string, maximum length 50</xs:documentation>
  </xs:annotation>
  <xs:restriction base="xs:string">
    <xs:minLength value="1"/>
    <xs:maxLength value="50"/>
    <xs:whiteSpace value="collapse"/>
  </xs:restriction>
</xs:simpleType>
<xs:simpleType name="String1To255">
  <xs:annotation>
    <xs:documentation>A non-empty string, maximum length 255</xs:documentation>
  </xs:annotation>
  <xs:restriction base="xs:string">
    <xs:minLength value="1"/>
    <xs:maxLength value="255"/>
    <xs:whiteSpace value="collapse"/>
  </xs:restriction>
</xs:simpleType>
<xs:simpleType name="String1To1000">
  <xs:annotation>
    <xs:documentation>A non-empty string, maximum length 1000</xs:documentation>
  </xs:annotation>
```

```xml
        <xs:restriction base="xs:string">
            <xs:minLength value="1"/>
            <xs:maxLength value="1000"/>
            <xs:whiteSpace value="collapse"/>
        </xs:restriction>
    </xs:simpleType>
    <xs:simpleType name="String1To5000">
        <xs:annotation>
            <xs:documentation>A non-empty string, maximum length 5000</xs:documentation>
        </xs:annotation>
        <xs:restriction base="xs:string">
            <xs:minLength value="1"/>
            <xs:maxLength value="1000"/>
            <xs:whiteSpace value="collapse"/>
        </xs:restriction>
    </xs:simpleType>
    <xs:simpleType name="Money">
        <xs:annotation>
            <xs:documentation>A decimal value representing a dollar figure</xs:documentation>
        </xs:annotation>
        <xs:restriction base="xs:decimal">
            <xs:fractionDigits value="2" fixed="true"/>
        </xs:restriction>
    </xs:simpleType>
    <xs:simpleType name="Date">
        <xs:annotation>
            <xs:documentation>A valid date</xs:documentation>
        </xs:annotation>
        <xs:restriction base="xs:date">
            <xs:minInclusive value="1990-01-01"/>
            <xs:maxExclusive value="2100-01-01"/>
        </xs:restriction>
    </xs:simpleType>
    <xs:simpleType name="DateOfBirth">
        <xs:annotation>
            <xs:documentation>A valid date</xs:documentation>
        </xs:annotation>
        <xs:restriction base="xs:date">
            <xs:minInclusive value="1900-01-01"/>
            <xs:maxExclusive value="2100-01-01"/>
        </xs:restriction>
    </xs:simpleType>
    <xs:simpleType name="Indicator">
        <xs:restriction base="xs:string">
            <xs:enumeration value="Y"/>
            <xs:enumeration value="N"/>
        </xs:restriction>
    </xs:simpleType>
    <xs:simpleType name="Gender">
        <xs:restriction base="xs:string">
            <xs:enumeration value="M"/>
            <xs:enumeration value="F"/>
        </xs:restriction>
    </xs:simpleType>
    <xs:simpleType name="Target">
        <xs:restriction base="xs:string">
            <xs:enumeration value="Test"/>
            <xs:enumeration value="Stage"/>
            <xs:enumeration value="Production"/>
        </xs:restriction>
    </xs:simpleType>
    <xs:simpleType name="MessageType">
        <xs:restriction base="xs:string">
            <xs:enumeration value="Media" />
            <xs:enumeration value="Order" />
            <xs:enumeration value="Payment" />
        </xs:restriction>
    </xs:simpleType>
    <xs:simpleType name="MessageAction">
        <xs:restriction base="xs:string">
            <xs:enumeration value="ActivateAccessMedia" />
            <xs:enumeration value="InactivateAccessMedia" />
            <xs:enumeration value="ActivateValueMedia" />
            <xs:enumeration value="InactivateValueMedia" />
            <xs:enumeration value="CreditDebitValueMedia" />
            <xs:enumeration value="BalanceInquiryValueMedia" />
```

```
        <xs:enumeration value="CreateOrder" />
        <xs:enumeration value="CancelOrder" />
      </xs:restriction>
    </xs:simpleType>
    <xs:simpleType name="SecurityToken">
      <xs:annotation>
        <xs:documentation>A non-empty string, maximum length 1000</xs:documentation>
      </xs:annotation>
      <xs:restriction base="xs:string">
        <xs:minLength value="1"/>
        <xs:maxLength value="1000"/>
        <xs:whiteSpace value="collapse"/>
      </xs:restriction>
    </xs:simpleType>
    <xs:simpleType name="CurrencyCode">
      <xs:restriction base="xs:string">
        <!--Australia, Dollars-->
        <xs:enumeration value="AUD" />
        <!--Bahamas, Dollars-->
        <xs:enumeration value="BSD" />
        <!--Canada, Dollars-->
        <xs:enumeration value="CAD" />
        <!--Switzerland, Francs-->
        <xs:enumeration value="CHF" />
        <!--Euro-->
        <xs:enumeration value="EUR" />
        <!--United Kingdom, Pounds-->
        <xs:enumeration value="GBP" />
        <!--Caymam Islands, Dollars-->
        <xs:enumeration value="KYD" />
        <!--Mexico, Pesos-->
        <xs:enumeration value="MXN" />
        <!--New Zealand, Dollars-->
        <xs:enumeration value="NZD" />
        <!--United States of America, Dollars-->
        <xs:enumeration value="USD" />
      </xs:restriction>
    </xs:simpleType>
</xs:schema>
```

Various modifications and additions can be made to the exemplary embodiments discussed without departing from the scope of the present invention. For example, while the embodiments described above refer to particular features, the scope of this invention also includes embodiments having different combinations of features and embodiments that do not include to include all of the described features. Accordingly, the scope of the present invention is intended to embrace all such alternatives, modifications, and variations as fall within the scope of the claims, together with all equivalents thereof.

What is claimed is:

1. A system for reservation integration and distribution, comprising:
   a core adapter module configured to receive reservation information from a reservation system, wherein the reservation information has a first format useable by the reservation system;
   a web service module configured to identify a provider system based on the reservation information and to place the reservation information into a second format useable by the provider system; and
   a distribution module configured to send the reservation information in the second format to the provider system.

2. The system of claim 1, wherein the reservation information comprises at least a name, a basic service, and a credit card number.

3. The system of claim 2, wherein the basic service comprises an arrival date for a ski resort lodging reservation.

4. The system of claim 1, wherein the distribution module is further configured to create an advance sale on the provider system according to the reservation information.

5. A computer-implemented method of reservation integration and distribution, comprising:
   receiving reservation information from a reservation system, wherein the reservation information has a first format useable by the reservation system;
   identifying a provider system based on the reservation information;
   processing the reservation information to place the reservation information into a second format useable by the provider system; and
   sending the reservation information in the second format to the provider system.

6. The method of claim 5, wherein the reservation information comprises at least a name, a basic service, a service provider providing the basic service, and a credit card number.

7. The method of claim 6, wherein the basic service comprises an arrival date for a ski resort lodging reservation, and wherein the service provider is the ski resort.

8. The method of claim 5, further comprising creating an advance sale on the provider system according to the reservation information.

9. A computer-implemented method for media activation, comprising:
   receiving a media activation request from a distribution point-of-sale system, wherein the media activation request has a first format useable by the distribution point-of-sale system;

identifying a provider system based on the media activation request;

processing the media activation request to place the media activation request into a second format useable by the provider system; and sending the media activation request in the second format to the provider system, wherein the media activation request comprises at least a unique identification number and a service provider identification.

10. A computer-implemented method for media activation, comprising:

receiving a media activation request from a distribution point-of-sale system, wherein the media activation request has a first format useable by the distribution point-of-sale system;

identifying a provider system based on the media activation request;

processing the media activation request to place the media activation request into a second format useable by the provider system; and sending the media activation request in the second format to the provider system, wherein the media activation request is a request to activate a physical medium for use in accessing services provided by a service provider, the method further comprising:

updating a database of the provider system with an activation of the physical medium based on the media activation request; and providing a supplier interface in communication with the database, the supplier interface configured to read the physical medium and to permit access to the services based on the activation.

11. The method of claim 10, wherein the physical medium is a card with a magnetic stripe, and wherein the supplier interface is a magnetic card stripe reader.

12. The method of claim 10, wherein the physical medium is an object with an RFID transmitter, and wherein the supplier interface is an RFID receiver.

13. The method of claim 10, wherein the physical medium is an object comprising a bar code, and wherein the supplier interface is a bar code reader.

14. The method of claim 12, wherein the object is a toy race car, wherein the service provider is a car racing venue, and wherein the supplier interface is configured to permit access to the car racing venue by unlocking a gate based on the activation.

15. A system for media activation, comprising:

a core adapter module configured to receive a media activation request from a distribution point-of-sale system, wherein the media activation request has a first format useable by the distribution point-of-sale system;

a web service module configured to identify a provider system based on the media activation request and to place the media activation request into a second format useable by the provider system; and a distribution module configured to send the media activation request in the second format to the provider system, wherein the media activation request comprises at least a unique identification number and a service provider identification.

16. A system for media activation, comprising:

a core adapter module configured to receive a media activation request from a distribution point-of-sale system, wherein the media activation request has a first format useable by the distribution point-of-sale system;

a web service module configured to identify a provider system based on the media activation request and to place the media activation request into a second format useable by the provider system; and a distribution module configured to send the media activation request in the second format to the provider system, wherein the media activation request is a request to activate a physical medium for use in accessing services provided by a service provider, the system further comprising:

a database of the provider system configured to store an activation of the physical medium based on the media activation request; and a supplier interface in communication with the database, the supplier interface configured to read the physical medium and to permit access to the services based on the activation.

17. The system of claim 16, wherein the physical medium is a card with a magnetic stripe, and wherein the supplier interface is a magnetic card stripe reader.

18. The system of claim 16, wherein the physical medium is an object with an RFID transmitter, and wherein the supplier interface is an RFID receiver.

19. The system of claim 16, wherein the physical medium is an object comprising a bar code, and wherein the supplier interface is a bar code reader.

20. The system of claim 18, wherein the object is a toy race car, wherein the service provider is a car racing venue, and wherein the supplier interface is configured to permit access to the car racing venue by unlocking a gate based on the activation.

* * * * *